(12) United States Patent
Ooba et al.

(10) Patent No.: US 10,749,453 B1
(45) Date of Patent: Aug. 18, 2020

(54) DRIVE DEVICE AND DRIVE METHOD OF BRUSHLESS MOTOR

(71) Applicant: Hitachi Automotive Systems, Ltd., Hitachinaka-shi, Ibaraki (JP)

(72) Inventors: Shingo Ooba, Isesaki (JP); Masaki Hano, Isesaki (JP)

(73) Assignee: Hitachi Automotive Systems, Ltd., Hitachinaka-shi (JP)

( * ) Notice: Subject to any disclaimer, the term of this patent is extended or adjusted under 35 U.S.C. 154(b) by 0 days.

(21) Appl. No.: 16/489,827

(22) PCT Filed: Feb. 1, 2018

(86) PCT No.: PCT/JP2018/003427
§ 371 (c)(1),
(2) Date: Aug. 29, 2019

(87) PCT Pub. No.: WO2018/173503
PCT Pub. Date: Sep. 27, 2018

(30) Foreign Application Priority Data

Mar. 22, 2017 (JP) ................................ 2017-056611

(51) Int. Cl.
*H02P 6/18* (2016.01)
*H02M 7/5387* (2007.01)
(52) U.S. Cl.
CPC .......... *H02P 6/18* (2013.01); *H02M 7/53871* (2013.01)
(58) Field of Classification Search
CPC ............................. H02P 6/18; H02M 7/53871
See application file for complete search history.

(56) References Cited

U.S. PATENT DOCUMENTS

| 9,035,588 B2* | 5/2015 | Hano ........... H02P 6/181 318/400.34 |
| 2013/0069571 A1 | 3/2013 | Okamoto et al. |
| 2016/0233803 A1 | 8/2016 | Hano |

FOREIGN PATENT DOCUMENTS

| JP | 2012-253844 A | 12/2012 |
| JP | 2013-66343 A | 4/2013 |
| JP | 2015-177622 A | 10/2015 |

(Continued)

OTHER PUBLICATIONS

International Search Report (PCT/ISA/210) issued in PCT Application No. PCT/JP2018/003427 dated Apr. 24, 2018 with English translation (seven pages).

(Continued)

*Primary Examiner* — Cortez M Cook
(74) *Attorney, Agent, or Firm* — Crowell & Moring LLP

(57) ABSTRACT

The drive device measures an open-phase voltage in an energization period in pulse width modulation control, and estimates position information of a rotor based on the measured voltage value, to drive the three-phase brushless motor. This drive device is configured so that, when a voltage pulse width of a set duty cycle is less than or equal to a predetermined value, energization with a voltage pulse width of a minimum duty cycle is performed twice in one period of pulse width modulation, and energization with a voltage pulse width of a correction duty cycle is performed twice in next one period of the pulse width modulation, so that energization with a voltage pulse width of a drive duty cycle corresponding to the set duty cycle is performed, on average in two periods.

14 Claims, 25 Drawing Sheets

(56) References Cited

FOREIGN PATENT DOCUMENTS

JP          2016-171647  A    9/2016
WO    WO 2015/041321  A1   3/2015

OTHER PUBLICATIONS

Japanese-language Written Opinion (PCT/ISA/237) issued in PCT Application No. PCT/JP2018/003427 dated Apr. 24, 2018 with unverified English translation (seven pages).

Japanese-language International Preliminary Report on Patentability (PCT/IPEA/416 & PCT/IPEA/409) issued in PCT Application No. PCT/JP2018/003427 dated Apr. 15, 2019 with Annexes (15 pages).

English translation of document C3 (Japanese-language International Preliminary Report on Patentability (PCT/IPEA/409) issued in PCT Application No. PCT/JP2018/003427 dated Apr. 15, 2019 previously filed on Aug. 29, 2019) three pages.

English translation of International Preliminary Report on Patentability (PCT/IB/338 & PCT/IPEA/409) issued in PCT Application No. PCT/JP2018/003427 dated Sep. 26, 2019 (five pages).

\* cited by examiner

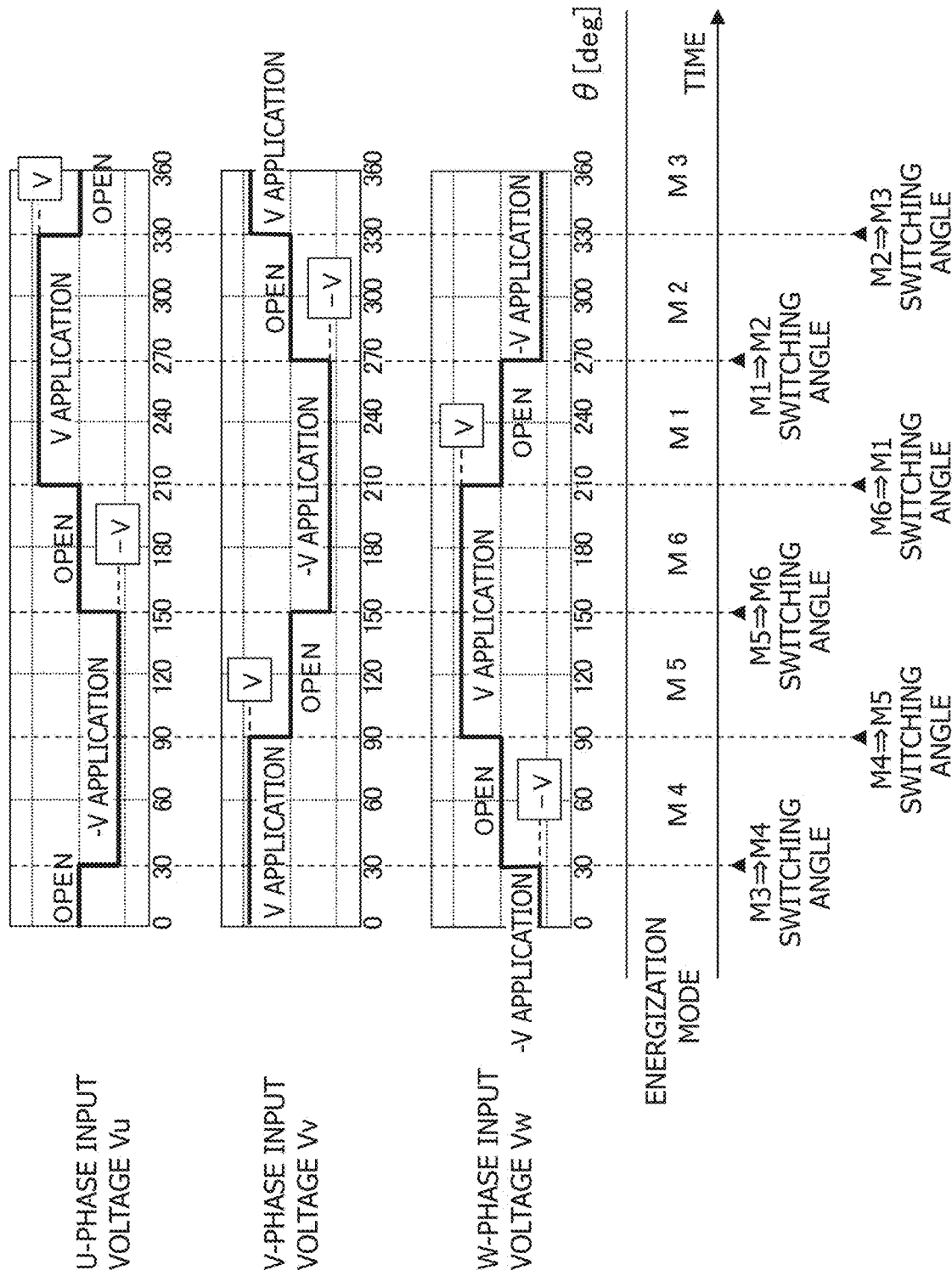

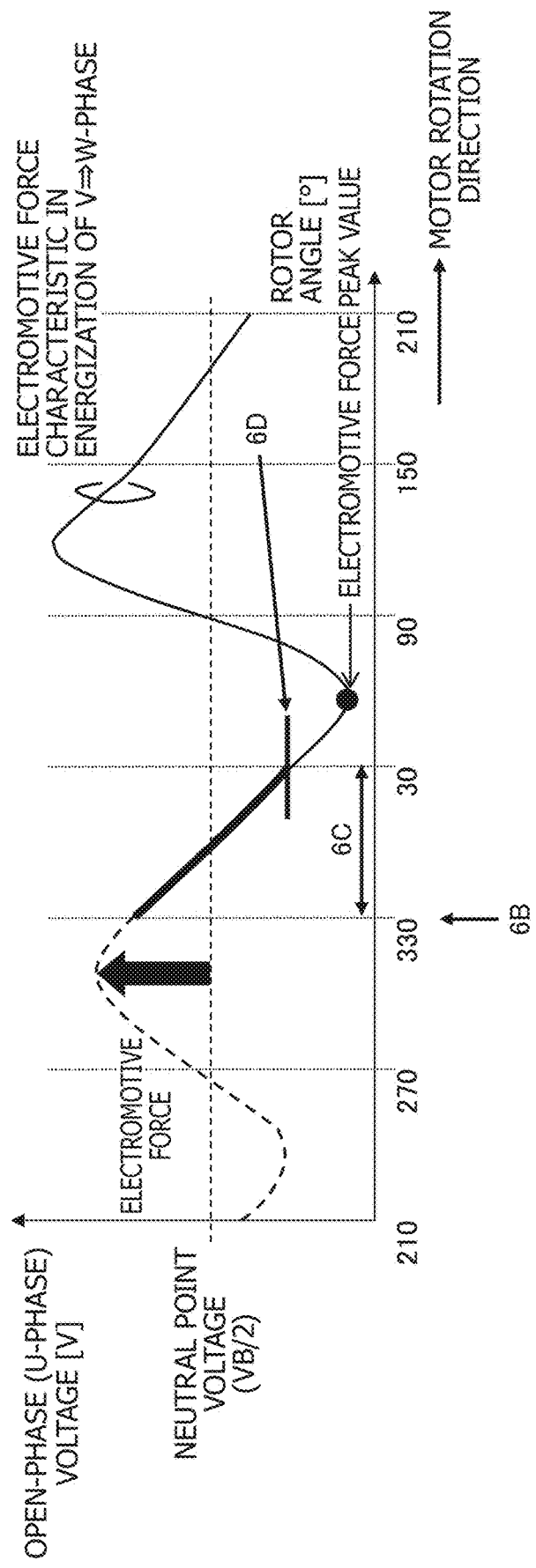

FIG. 8

| Voltage pulse width of command duty cycle (Dt) | PWM output pattern | Energization direction in major period | Energization direction in correction period |
|---|---|---|---|
| max —<br>Minimum duty cycle (Dmin) —<br>Dmin /2 —<br>min — | Pattern A | Energize in positive torque direction with voltage pulse width Dt of command duty cycle | Energize in positive torque direction with voltage pulse width Dt of command duty cycle |
| | Pattern B | Energize in positive torque direction with voltage pulse width Dmin of minimum duty cycle | Energize in positive torque direction with (voltage pulse width Dt of command duty cycle)×2−(voltage pulse width Dmin of minimum duty cycle) |
| | Pattern C (conventional) | Energize in positive torque direction with voltage pulse width Dmin of minimum duty cycle | Energize in negative torque direction with (voltage pulse width Dmin of minimum duty cycle) −(voltage pulse width Dt of command duty cycle)×2 |
| | Pattern D (present invention) | Energize twice in positive torque direction with voltage pulse width Dmin of minimum duty cycle | Energize in negative torque direction with (voltage pulse width Dmin of minimum duty cycle) −(voltage pulse width Dt of command duty cycle)×2 |

DRIVE DEVICE AND DRIVE METHOD OF BRUSHLESS MOTOR

TECHNICAL FIELD

The present invention relates to drive devices and to drive methods for brushless motors that drive, for example, an electric water pump for use in a cooling system of an internal combustion engine for a vehicle, or an electric oil pump for use in an oil hydraulic pump system.

BACKGROUND ART

Patent Document 1 discloses a drive device that performs pulse shift to measure a phase voltage at the time of driving a brushless motor at extremely low rotational speed by low-speed sensorless control. In pulse shift control, it is necessary to limit the minimum value of a voltage pulse width in order to obtain a pulse induced voltage of a non-energized phase after convergence of ringing (voltage vibration) due to on/off operation of switching elements in a motor drive circuit.

Thus, for example, in Patent Document 2, two consecutive periods of a pulse width modulation (PWM) signal are divided into a major period and an adjustment period. Then, the major period is limited to a lower limit duty cycle, as a period for measuring a pulse induced voltage, and the adjustment period is set so that a duty cycle obtained by averaging the major period duty cycle and the adjustment period duty cycle becomes a set duty cycle.

REFERENCE DOCUMENT LIST

Patent Documents

Patent Document 1: JP 2012-253844 A
Patent Document 2: JP 2015-177622 A

SUMMARY OF THE INVENTION

Problem to be Solved by the Invention

However, in the pulse shift control, the position determination frequency is once in two periods of the PWM signal, and if the motor load varies during this time period, control may be delayed. This delay in control may cause a decrease in rotational accuracy of a brushless motor at the time of driving at extremely low rotational speed, which causes a decrease in controllability. Moreover, since energization in a positive torque direction and energization in a negative torque direction are performed alternately every period, a torque variation synchronized with the PWM carrier frequency might occur, and this might generate unpleasant noise near the carrier frequency (e.g., high-pitched noise which sounds like "eeeeee").

The present invention has been made in view of the above circumstances, and an object of the present invention is to provide a drive device and a drive method for a brushless motor capable of suppressing a decrease in rotational accuracy and controllability, which might be caused by pulse shift control.

Furthermore, another object of the present invention is to provide a drive device and a drive method of a brushless motor capable of suppressing a decrease in rotational accuracy and controllability due to pulse shift control, and capable of reducing noise due to a torque variation synchronized with PWM carrier frequency at the time of pulse shift control.

Means for Solving the Problem

According to one aspect of the present invention, there is provided a drive device of a three-phase brushless motor, comprising a control unit configured to measure an open-phase voltage in an energization period in pulse width modulation control of the three-phase brushless motor, configured to estimate position information of a rotor based on the measured voltage value, and configured to control a voltage applied to the three-phase brushless motor, wherein when a voltage pulse width of a set duty cycle is less than or equal to a predetermined value, the control unit performs energization with a voltage pulse width of a minimum duty cycle twice in one period of pulse width modulation, the minimum duty cycle being capable of measuring a pulse induced voltage in a non-energized phase, and the control unit performs energization with a voltage pulse width of a correction duty cycle twice in next one period of the pulse width modulation, so that the control unit performs energization with a voltage pulse width of a drive duty cycle corresponding to the set duty cycle, on average in two periods, wherein when driving the three-phase brushless motor by performing energization by the pulse width modulation control, the control unit performs pulse shift control when a set duty cycle of an energized phase is less than or equal to a predetermined value, the pulse shift control including the energization with the voltage pulse width of the minimum duty cycle capable of measuring the pulse induced voltage in the non-energized phase, and the energization with the voltage pulse width of the correction duty cycle, wherein the control unit performs the energization with the voltage pulse width of the minimum duty cycle and the energization with the voltage pulse width of the correction duty cycle from a major period to a correction period of the pulse width modulation control, and the control unit sets an interval between the energization with the voltage pulse width of the minimum duty cycle and the energization with the voltage pulse width of the correction duty cycle, to be shorter than energization intervals in the respective duty cycles.

According to another aspect of the present invention, there is provided a drive method of a three-phase brushless motor including measuring an open-phase voltage in an energization period in pulse width modulation control of the three-phase brushless motor, estimating position information of a rotor based on the measured voltage value, and driving the three-phase brushless motor, the method comprising:

when a voltage pulse width of a set duty cycle is less than or equal to a predetermined value, performing energization with a voltage pulse width of a minimum duty cycle twice in one period of pulse width modulation, the minimum duty cycle being capable of measuring a pulse induced voltage in a non-energized phase; and performing energization with a voltage pulse width of a correction duty cycle twice in next one period of the pulse width modulation, wherein energization with a voltage pulse width of a drive duty cycle corresponding to the set duty cycle is performed, on average in two periods, wherein in the pulse width modulation control, pulse shift control is performed when energization is performed to drive the three-phase brushless motor and the set duty cycle of an energized phase is less than or equal to a predetermined value, and the pulse shift control includes the energization with the voltage pulse width of the minimum duty cycle capable of measuring a pulse induced voltage in a non-energized phase, and the energization with the voltage pulse width of the correction duty cycle, wherein the energization with the voltage pulse width of the minimum duty cycle and the energization with the voltage pulse width of the correction duty cycle are performed from a major period to a correction period of the pulse width modulation control, wherein an interval between the energization with the voltage pulse width of the minimum duty cycle and the energization with the voltage pulse width of the correction duty cycle is set to be shorter than energization intervals in the respective duty cycles.

Effects of the Invention

According to one aspect of the present invention, in the pulse shift control, it is possible to perform the position determination twice in two periods of the PWM signal, so that it is possible to increase the position determination frequency. Thus, it is possible to suppress the decrease in rotational accuracy and controllability at the time of driving at extremely low rotational speed.

Furthermore, by performing the energization twice in two periods of the PWM signal and by shortening the interval between the energization in the positive torque direction and the energization in the negative torque direction, it is possible to increase the position determination frequency, and it is also possible to adjust in the negative torque direction immediately after the energization in the positive torque direction. This makes it possible to suppress the decrease in rotational accuracy and controllability due to the pulse shift control, and to reduce noise due to the torque variation synchronized with the PWM carrier frequency at the time of the pulse shift control.

BRIEF DESCRIPTION OF THE DRAWINGS

FIG. 4 is a timing chart illustrating an example of a three-phase input voltage in a 120-degree energization method of the brushless motor.

FIG. 6A is a view for explaining the low-speed sensorless control of the brushless motor, and is a waveform diagram of open-phase electromotive force.

FIG. 8 is a view for explaining PWM output patterns and selection thereof.

MODE FOR CARRYING OUT THE INVENTION

Hereinbelow, embodiments of the present invention will be described with reference to the accompanying drawings.

First Embodiment

Figure 1:
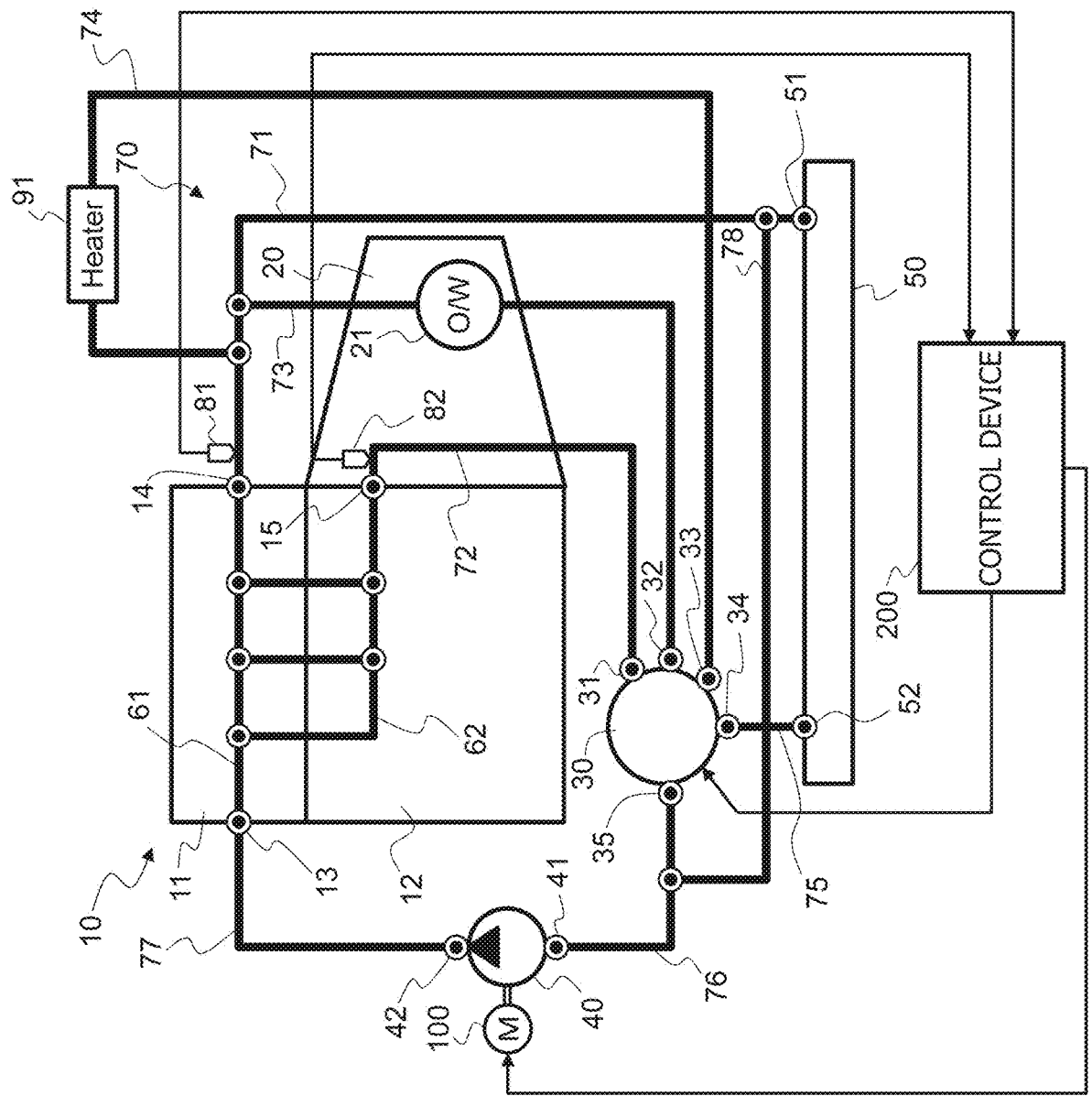
FIG. 1 is a schematic configuration view illustrating a cooling system for an internal combustion engine for a vehicle.

FIG. 1 illustrates a schematic configuration of a cooling system for an internal combustion engine for a vehicle, in which the present invention is applied to a brushless motor for an electric water pump. This cooling system is a water-cooled cooling device that circulates cooling water through a circulation passage, and is provided with an electric water pump 40 actuated by a brushless motor 100. Brushless motor 100 is driven under sensorless control by a control device 200, such as an ECU.

Brushless motor 100 actuates electric water pump 40 in accordance with the operation state of the internal combustion engine, such as cold start, warm up, and idle reduction after warming up, to cause cooling water to circulate through different circulation passages depending on a heat generating state of an internal combustion engine 10. During idle reduction after warming up, brushless motor 100 is driven at extremely low rotational speed (for example, 100 rpm or less) under low-speed sensorless control. At this time, there is performed so-called pulse shift control in which switch timings of the phases are shifted in a freely chosen manner to measure a phase voltage.

That is, a transmission 20, such as a continuously variable transmission (CVT), as an example of a power transmission device, is connected to the output shaft of internal combustion engine 10, and the output of transmission 20 is transmitted to the drive wheels (not illustrated) of the vehicle.

The cooling system of internal combustion engine 10 includes: a flow control valve 30; electric water pump 40 actuated by brushless motor 100; a radiator 50; a cylinder head cooling water passage 61; a cylinder block cooling water passage 62; a heater core (heater) 91; an oil warmer (01W) 21 of transmission 20; pipes 70 connecting these components; and the like.

Cylinder head cooling water passage 61 of internal combustion engine 10 extends across a cylinder head 11, and connects a cooling water inlet 13 provided at one end of cylinder head 11 in the cylinder arrangement direction to a cooling water outlet 14 provided at the other end of cylinder head 11 in the cylinder arrangement direction.

Cylinder block cooling water passage 62 of internal combustion engine 10 branches off from cylinder head cooling water passage 61 and enters into a cylinder block 12. Cylinder block cooling water passage 62 extends across cylinder block 12, and is connected to a cooling water outlet 15 provided in cylinder block 12.

One end of a first cooling water pipe 71 is connected to cooling water outlet 14 of cylinder head 11, and the other end of first cooling water pipe 71 is connected to a cooling water inlet 51 of radiator 50.

On the other hand, one end of a second cooling water pipe 72 is connected to cooling water outlet 15 of cylinder block cooling water passage 62, and the other end of second cooling water pipe 72 is connected to a first inlet port 31 of four inlet ports 31 to 34 of flow control valve 30.

Furthermore, a third cooling water pipe 73 has one end connected to the middle of first cooling water pipe 71, and the other end connected to a second inlet port 32 of flow control valve 30. Oil warmer 21 that adjusts the temperature of a hydraulic oil of transmission 20 is provided in the middle to third cooling water pipe 73.

A fourth cooling water pipe 74 has one end connected to first cooling water pipe 71 between cooling water outlet 14 and the connection point of third cooling water pipe 73, and the other end connected to a third inlet port 33 of flow control valve 30. Fourth cooling water pipe 74 is provided with various types of heat exchangers, such as heater core 91 for heating air for air conditioning in the vehicle air conditioner.

A fifth cooling water pipe 75 has one end connected to a cooling water outlet 52 of radiator 50, and the other end connected to a fourth inlet port 34 of flow control valve 30.

Flow control valve 30 has one outlet port 35. One end of a sixth cooling water pipe 76 is connected to outlet port 35, and the other end of sixth cooling water pipe 76 is connected to an intake port 41 of electric water pump 40.

One end of a seventh cooling water pipe 77 is connected to a discharge port 42 of electric water pump 40, and the other end of seventh cooling water pipe 77 is connected to cooling water inlet 13 of cylinder head 11.

An eighth cooling water pipe 78 has one end connected to first cooling water pipe 71 on the downstream side of the portion at which third cooling water pipe 73 and fourth cooling water pipe 74 are connected, and the other end connected to sixth cooling water pipe 76.

As described above, flow control valve 30 has four inlet ports 31 to 34 and one outlet port 35. Cooling water pipes 72, 73, 74, 75 are connected to inlet ports 31 to 34, respectively. Flow control valve 30 controls the opening area of each of cooling water pipes 72, 73, 74, 75 (outlet area of each cooling water circulation line) to adjust the cooling water amount circulating through cooling water pipes 72, 73, 74, 75 (cooling water circulation lines).

Even if all inlet ports 31 to 34 of flow control valve 30 were closed, a cooling water which has passed through cylinder head cooling water passage 61 is able to circulate, bypassing radiator 50 by eighth cooling water pipe 78.

Abovementioned electric water pump 40 (brushless motor 100) and flow control valve 30 are controlled by control device 200.

Control device 200 controls the discharge flow rate of electric water pump 40 (rotational speed of brushless motor 100) and the opening area of inlet ports 31 to 34 of flow control valve 30 based on cooling water temperature information, and the like, of internal combustion engine 10 sensed by water temperature sensors 81, 82. For example, water temperature sensor 82 of water temperature sensors 81 and 82 may be omitted, and the present invention is not limited to the configuration provided with two water temperature sensors.

For example, control device 200 controls flow control valve 30 so that all inlet ports 31 to 34 are closed at cold start in which the cooling water temperature of internal combustion engine 10 is lower than a cold machine determination threshold. Furthermore, control device 200 controls the rotational speed of electric water pump 40 (brushless motor 100) to an extremely low rotational speed (for example, about 100 rpm to about 200 rpm).

That is, at cold start of internal combustion engine 10, a cooling water which has flowed into cylinder head 11 (cylinder head cooling water passage 61) circulates without passing through other heat exchangers including radiator 50, and the circulation rate of the cooling water is minimized. This promotes an increase in temperature of cylinder head 11, and reduces variation in temperature in the cooling water circulation passage.

Thereafter, control device 200 opens inlet ports 31 to 34 and increases the rotational speed of electric water pump 40 (brushless motor 100), as the cooling water temperature of internal combustion engine 10 increases, so as to maintain the cooling water temperature within an appropriate temperature range.

When internal combustion engine 10 is stopped due to idle reduction, or the like, in a warmed-up state, the pulse shift control is performed. Electric water pump 40 (brushless motor 100) is driven at extremely low rotational speed (for example, 100 rpm or less), to suppress an increase in temperature by allowing the cooling water to circulate through cylinder head 11 even in a low flow rate and even while internal combustion engine 10 is stopped.

In this case, the cooling water flowing into cylinder head cooling water passage 61 circulates through other heat exchangers including radiator 50, so that cylinder head 11 is slowly cooled. Thus, even when internal combustion engine 10 stops after warming up, it is possible to suppress the occurrence of hot spots at which only the cooling water temperature in the engine and its vicinity, in particular, cylinder head 11, increases, so that the cooling water temperature can be made uniform, and thus, abnormal combustion at restart can be suppressed. Moreover, since electric water pump 40 is driven at the extremely low rotational speed, it is possible to prevent cylinder head 11 from being excessively cooled or to prevent power consumption from being increased.

There may be a case in which the flow passage resistance suddenly changes, when the electric water pump 40 is driven at the extremely low rotational speed at switching between the flow passages of the cooling water by flow control valve 30. At this time, since brushless motor 100 rotates at the extremely low rotational speed and accordingly the torque is small, there is a possibility that loss of synchrony occurs when the load rapidly increases.

Thus, it may be preferable to increase the frequency of position determination when switching the cooling water flow passages.

Figure 2:
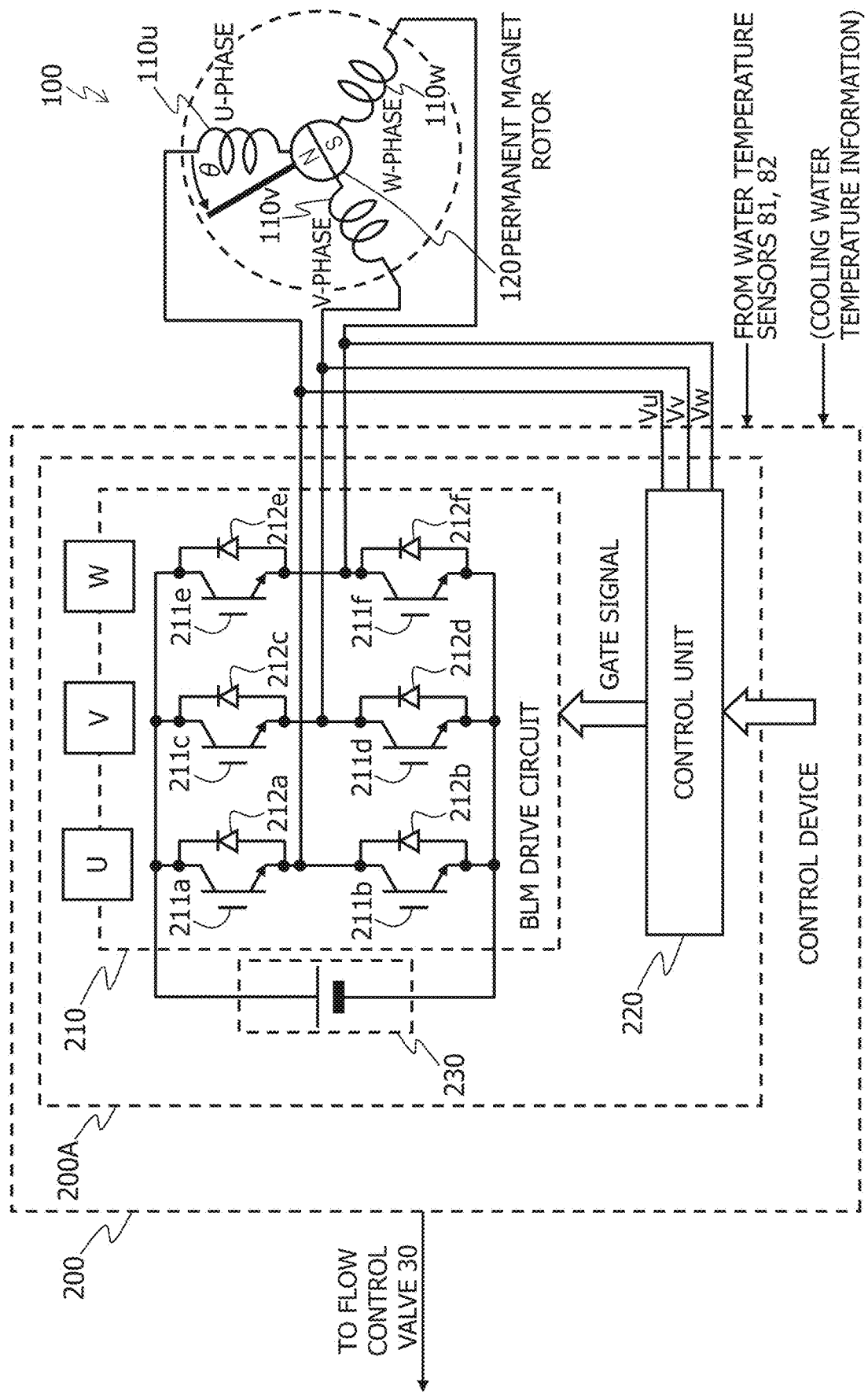
FIG. 2 is a circuit diagram of a motor drive device and a brushless motor according to a first embodiment of the present invention.

FIG. 2 is a circuit diagram illustrating an example of the configuration of brushless motor 100 serving as a drive source of electric water pump 40, and the configuration of a drive device 200A of brushless motor 100 in control device 200.

Drive device 200A that controls drive of brushless motor 100, includes a motor drive circuit (BLM drive circuit) 210, a control unit 220, and a power supply circuit (battery) 230.

Control unit 220 has a microcomputer including an A/D converter, a microprocessor (CPU, MPU), and the like.

Brushless motor 100 is a three-phase DC brushless motor. Star-connected three-phase coils 110$u$, 110$v$, 110$w$ of U-phase, V-phase and W-phase are provided in a cylindrical stator (not illustrated). A permanent magnet rotor (rotor) 120 is rotatably provided in a space formed at the center of the stator.

Motor drive circuit 210 has an inverter circuit in which switching elements 211$a$ to 211$f$ are three-phase bridge-connected. Although each of switching elements 211$a$ to 211$f$ is constituted by an insulated gate bipolar transistor (IGBT) in this example, other semiconductor devices for control electric power, such as a field effect transistor (FET) may be used. Between the collector and emitter of each IGBT, the cathode and the anode of the corresponding diode 212$a$ to 212$f$ are connected in a manner such that the direction of supplying power is reversed.

Control terminals (gate terminals) of switching elements 211$a$ to 211$f$ are connected to control unit 220, and control unit 220 controls turning on/off of switching elements 211$a$ to 211$f$ by triangle-wave comparison PWM, to control a voltage (motor input voltage) applied to brushless motor 100.

In the triangle-wave comparison PWM control, control unit 220 determines the timing for turning on or off each of switching elements 211$a$ to 211$f$ by comparing between a triangular wave (carrier) and a PWM timer (PWM duty) set based on a command duty cycle (command pulse width).

The greater the duty cycle, the greater value the PWM timer is set to. For example, the PWM timer is set to the maximum for 100% duty cycle, and set to the minimum (zero) for 0% duty cycle.

Brushless motor 100 does not include any sensor for determining position information of rotor 120. Control unit 220 performs sensorless drive control on brushless motor 100 without using any sensor for determining position information of rotor 120.

Control unit 220 switches between two sensorless drive methods, i.e., a sine-wave drive method and a square-wave drive method, in accordance with the motor rotational speed.

In the sine-wave drive method, brushless motor 100 is driven by applying a sine-wave voltage to each phase of the three-phase coils 110$u$, 110$v$, 110$w$.

In this sine-wave drive method, control unit 220 obtains position information of rotor 120 from an induced voltage (speed electromotive force) generated by rotation of rotor 120. Furthermore, in the interval between determination of the rotor position based on the speed electromotive force, control unit 220 estimates the rotor position based on the motor rotational speed, and calculates a three-phase output value from the estimated rotor position and the PWM duty. Then, control unit 220 causes a three-phase alternating current to flow through the phases by controlling the direction and magnitude of the current based on differences between phase-to-phase voltages.

Control unit 220 calculates the motor rotational speed based on the determination frequency of the rotor position.

In the square-wave drive method, control unit 220 drives brushless motor 100 by sequentially switching between patterns (energization modes) for selecting two phases to which a pulse voltage is to be applied from the three phases, each time rotor 120 reaches one of the predetermined positions.

In this square-wave drive method, control unit 220 applies a pulse-form voltage to these two phases selected to be energized, and acquires position information of rotor 120 by comparing a voltage (transformer electromotive force) in a non-energized phase (open phase) induced by this voltage application and its threshold. Based on this position information, control unit 220 determines whether it is the timing for switching between the energization modes, i.e., the patterns for selecting phases to be energized.

Here, as the motor rotational speed decreases, the output level of the speed electromotive force measured for rotor position determination in the sine-wave drive method decreases. Thus, the rotor position determination accuracy in the sine-wave drive method degrades in a low rotational speed range. On the other hand, the pulse induced voltage measured for rotor position determination in the square-wave drive method can be measured even in a low rotational speed range including the motor stopped state. Thus, the square-wave drive method allows maintaining rotor position determination accuracy even in a low rotational speed range.

In light of the above, control unit 220 controls brushless motor 100 by the sine-wave drive method in a high rotational speed range within which rotor position information can be sufficiently accurately determined by this sine-wave drive method, i.e., in a motor rotational speed range above a preset rotational speed. On the other hand, control unit 220 controls brushless motor 100 by the square-wave drive method in a low rotational speed range within which rotor position information cannot be sufficiently accurately determined by the sine-wave drive method.

Here, the low rotational speed range within which rotor position information cannot be sufficiently accurately determined by the sine-wave drive method as described above includes a motor rotational speed range below the preset rotational speed and a rotational speed range at start of brushless motor 100.

Furthermore, control unit 220 performs the PWM control on brushless motor 100 by determining the PWM control duty cycle in accordance with the difference between a determined motor rotational speed and a target motor rotational speed (command value of the rotational speed), and adjusting the actual motor rotational speed toward the target motor rotational speed.

Figure 3:
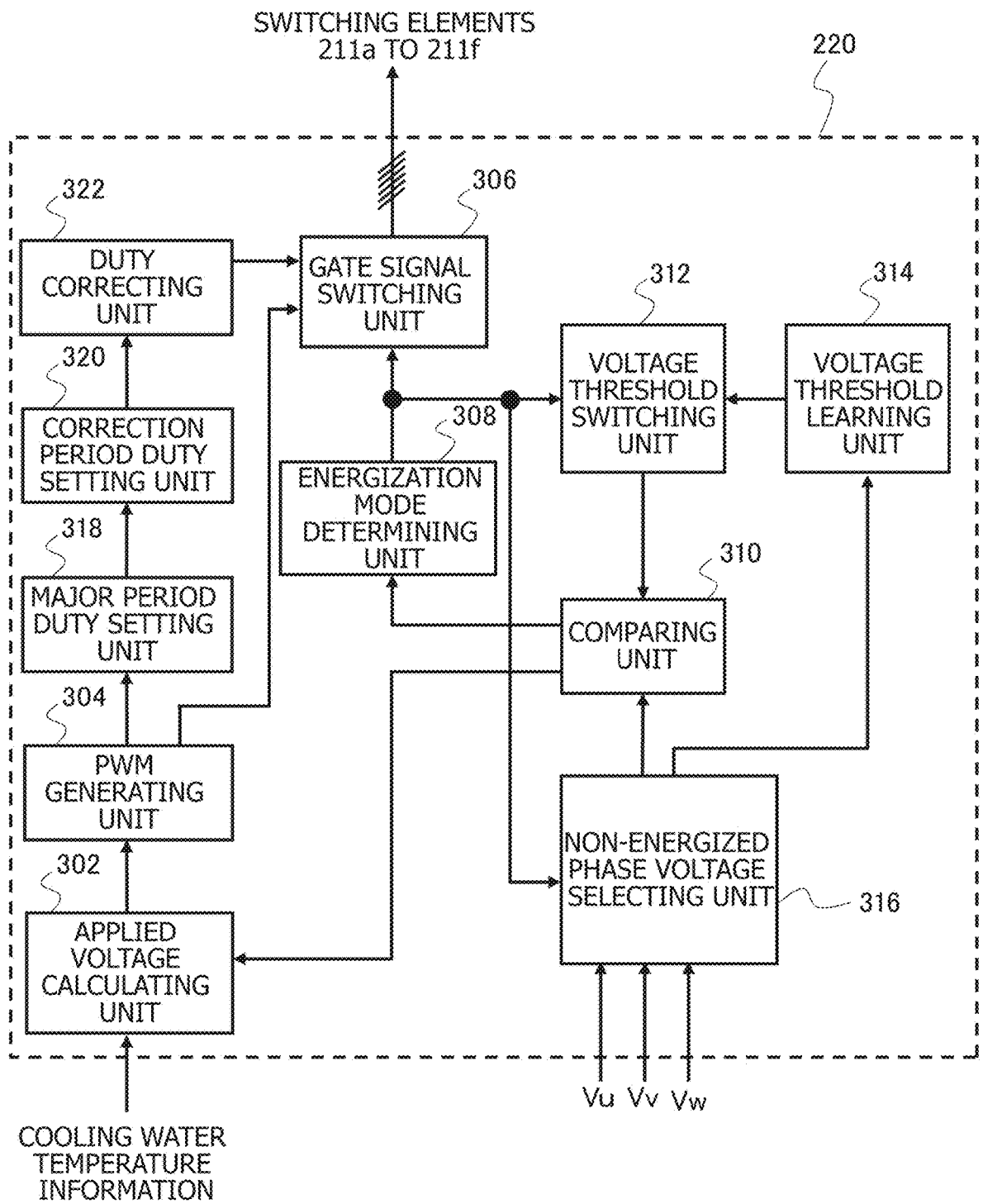
FIG. 3 is a functional block diagram illustrating components in a control unit of FIG. 2 that are related to low-speed sensorless control.

FIG. 3 is a functional block diagram illustrating components in control unit 220 that are related to the low-speed sensorless control.

Control unit 220 includes an applied voltage calculating unit 302, a PWM generating unit 304, a gate signal switching unit 306, an energization mode determining unit 308, a comparing unit 310, a voltage threshold switching unit 312, a voltage threshold learning unit 314, a non-energized phase voltage selecting unit 316, a major period duty setting unit 318, a correction period duty setting unit 320, a duty correcting unit 322, and the like.

The cooling water temperature information of internal combustion engine 10 sensed by water temperature sensors 81 and 82 is input to applied voltage calculating unit 302.

Applied voltage calculating unit 302 calculates a target rotational speed and a motor rotational speed of brushless motor 100 based on the cooling water temperature information and a mode switching trigger signal output from comparing unit 310, and calculates a command value of the applied voltage based on the calculated target rotational speed and the motor rotational speed.

PWM generating unit 304 generates a pulse width modulated PWM signal based on the command value of the applied voltage calculated by applied voltage calculating unit 302.

Energization mode determining unit 308 is a device that outputs a mode command signal for determining the energization mode of motor drive circuit 210, and switches the energization modes in six ways using the mode switching trigger signal output by comparing unit 310 as a trigger.

The energization mode is a selection pattern of two phases to which a pulse voltage is applied among the three phases, the U-phase, the V-phase, and the W-phase, of brushless motor 100. There are six energization modes, that is, a first energization mode M1 in which a current flows from the U-phase to the V-phase, a second energization mode M2 in which a current flows from the U-phase to the W-phase, a third energization mode M3 in which a current flows from the V-phase to the W-phase, a fourth energization mode M4 in which a current flows from the V-phase to the U-phase, a fifth energization mode M5 in which a current flows from the W-phase to the U-phase, and a sixth energization mode M6 in which a current flows from the W-phase to the V-phase.

Energization mode determining unit 308 outputs the mode command signal instructing one of first energization mode M1 to sixth energization mode M6 according to the mode switching trigger signal output from comparing unit 310.

Gate signal switching unit 306 determines as to what kind of operation each of switching elements 211a to 211f of motor drive circuit 210 performs to achieve switching, based on the mode command signal that is an output of energization mode determining unit 308 and based on the PWM signal generated in PWM generating unit 304. In accordance with this determination, gate signal switching unit 306 outputs six gate pulse signals to motor drive circuit 210.

According to the energization mode, voltage threshold switching unit 312 sequentially switches and outputs a voltage threshold that is used to determine the timing for switching between the energization modes. The timing for switching between the thresholds is determined based on the mode command signal that is the output of energization mode determining unit 308.

According to the mode command signal, non-energized phase voltage selecting unit 316 selects a measured value of a voltage of the non-energized phase from the three-phase terminal voltages Vu, Vv, and Vw of brushless motor 100, and outputs the selected measured value to comparing unit 310 and voltage threshold learning unit 314.

Strictly speaking, the terminal voltage of the non-energized phase is a voltage between the ground (GND) and the terminal. However, in the present embodiment, the voltage at the neutral point is measured, or the voltage at the neutral point is considered to be ½ of the power supply voltage VB, and a difference between the voltage at this neutral point and the voltage between the ground (GND) and the terminal (i.e., phase voltage) is obtain as the terminal voltage of the non-energized phase.

Comparing unit 310 compares the threshold output from voltage threshold switching unit 312 with the measured voltage value (measured value of the pulse induced voltage) of the non-energized phase output from non-energized phase voltage selecting unit 316, to determine whether it is the timing for switching between the energization modes, in other words, whether the rotor is at the rotor position (magnetic pole position) at which the energization modes are switched. Comparing unit 310 outputs a mode switching trigger to energization mode determining unit 308, when it is determined that the timing for switching has come.

Voltage threshold learning unit 314 is a device that updates and stores a threshold that is used to determine the timing for switching between the energization modes.

The pulse induced voltage of the non-energized phase (open phase) varies due to manufacturing variations of brushless motor 100, measurement variations of the voltage measurement circuit, etc. Thus, if a fixed value were used as the threshold, there may be a possibility of erroneously determination of the timing for switching between the energization modes.

Therefore, voltage threshold learning unit 314 measures a pulse induced voltage at a predetermined magnetic pole position at which the energization modes are switched, and performs threshold learning processing for correcting the threshold stored in voltage threshold switching unit 312 based on the measurement result.

The energization modes include the six energization modes M1 to M6, as described above. Control unit 220 sequentially switches these energization modes M1 to M6 at switching angle positions set at intervals of electrical angle of 60 degrees, so that two phases to which pulse voltages (pulse-like voltages) are applied, among the three phases of brushless motor 100, are sequentially switched, so as to drive brushless motor 100 to rotate.

Assuming that the angular position of the U-phase coil 110*u* is a reference position (angle=0 degree) of rotor (magnetic pole) 120, control unit 220 switches from third energization mode M3 to fourth energization mode M4 when the angular position (magnetic pole position θ) of rotor 120 is 30 degrees, as illustrated in FIG. 4. Control unit 220 switches from fourth energization mode M4 to fifth energization mode M5, when the rotor angular position is 90 degrees, and switches from fifth energization mode M5 to sixth energization mode M6, when the rotor angular position is 150 degrees. Furthermore, control unit 220 switches from sixth energization mode M6 to first energization mode M1, when the rotor angular position is 210 degrees, and switches from first energization mode M1 to second energization mode M2, when the rotor angular position is 270 degrees. Furthermore, control unit 220 switches from second energization mode M2 to third energization mode M3, when the rotor angular position is 330 degrees.

Here, voltage threshold switching unit 312 of control unit 220 stores, in an updatable manner, the induced voltage (transformer electromotive force) of the non-energized phase at the angular position of rotor 120 at which the energization modes are switched, as a threshold, and voltage threshold switching unit 312 outputs a threshold corresponding to the energization mode at that time.

Comparing unit 310 outputs a signal indicating that an angle at which switching to the next energization mode is performed is determined, when the induced voltage of the non-energized phase reaches the threshold, and energization mode determining unit 308 performs switching between energization modes based on this signal.

For example, in first energization mode M1 for causing a current to flow sequentially through the U- and V-phases, control unit 220 (gate signal switching unit 306) variably controls the average value of voltages applied to the U- and V-phases, which are energized in accordance with the PWM duty. Specifically, control unit 220 (gate signal switching unit 306) controls the on/off ratio of V-phase upper switching element 211*c* (V-phase upper arm) and V-phase lower switching element 211*d* (V-phase lower arm) by a complementary PWM method while turning on U-phase upper switching element 211*a* (U-phase upper arm).

Here, in first energization mode M1, for example, control unit 220 (gate signal switching unit 306) turns off remaining switching elements 211*b*, 211*e*, 211*f* other than U-phase upper switching element 211*a*, V-phase upper switching element 211*c*, and V-phase lower switching element 211*d*.

Control unit 220 (gate signal switching unit 306) performs the PWM control of the turning on/off of the switching element of the upper arm and the switching element of the lower arm of the lower phase by the complementary control method also in the energization modes other than first energization mode M1.

Figure 5A:
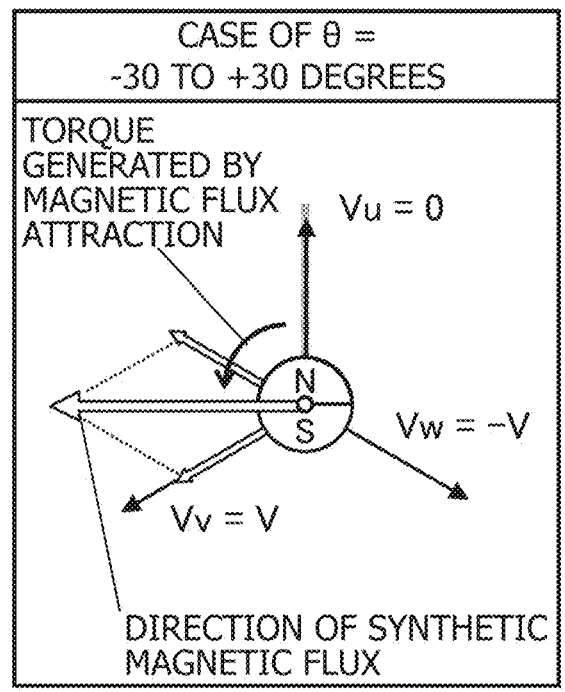
FIG. 5A is a schematic view illustrating a motor operation in the 120-degree energization method, in which the relationship between three-phase input voltages and magnetic fluxes, in a case in which the magnetic pole position of a rotor is within an angular range of −30 degrees to +30 degrees, is illustrated.
Figure 5B:
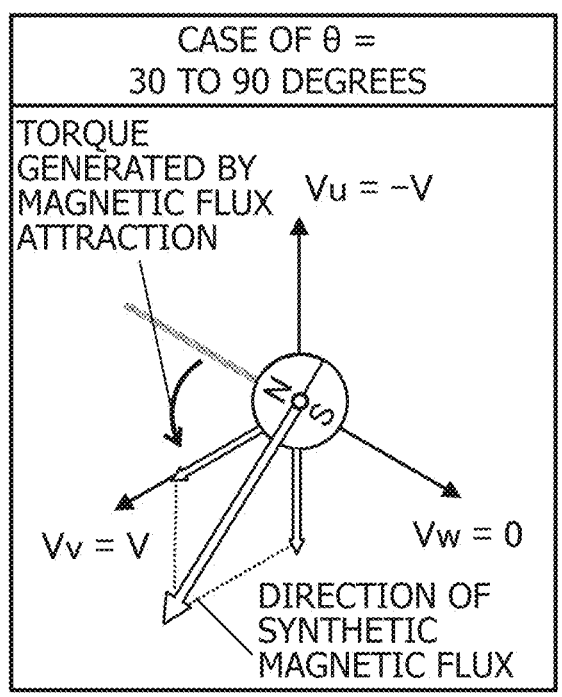
FIG. 5B is a schematic view illustrating a motor operation in the 120-degree energization method, in which the relationship between three-phase input voltages and magnetic fluxes, in a case in which the magnetic pole position of the rotor is within an angular range of 30 degrees to 90 degrees, is illustrated.
Figure 5C:
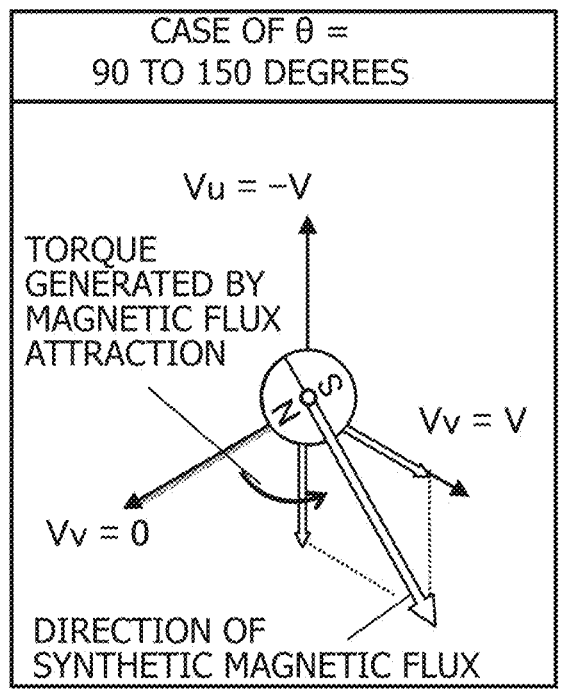
FIG. 5C is a schematic view illustrating a motor operation in the 120-degree energization method, in which the relationship between three-phase input voltages and magnetic fluxes, in a case in which the magnetic pole position of the rotor is within an angular range of 90 degrees to 150 degrees, is illustrated.
Figure 5D:
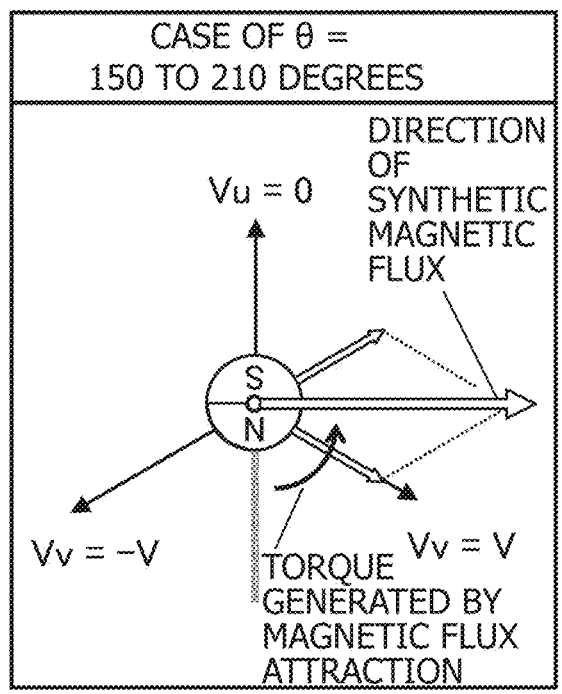
FIG. 5D is a schematic view illustrating a motor operation in the 120-degree energization method, in which the relationship between three-phase input voltages and magnetic fluxes, in a case in which the magnetic pole position of the rotor is within an angular range of 150 degrees to 210 degrees, is illustrated.
Figure 5E:
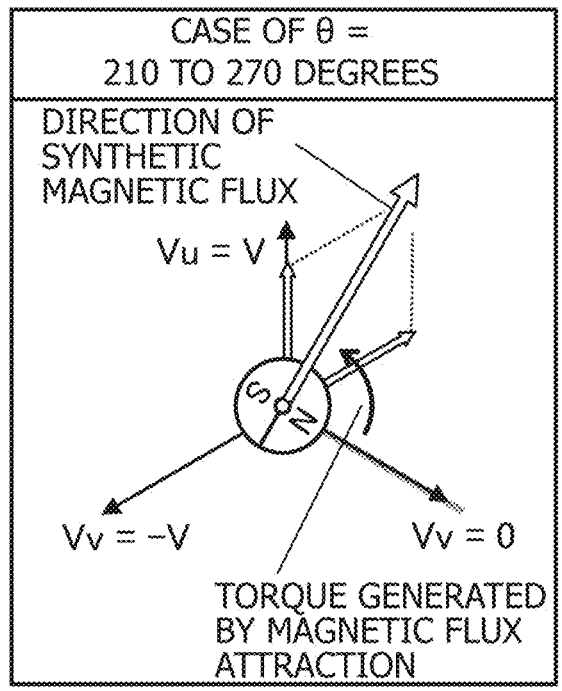
FIG. 5E is a schematic view illustrating a motor operation in the 120-degree energization method, in which the relationship between three-phase input voltages and magnetic fluxes, in a case in which the magnetic pole position of the rotor is within an angular range of 210 degrees to 270 degrees, is illustrated.
Figure 5F:
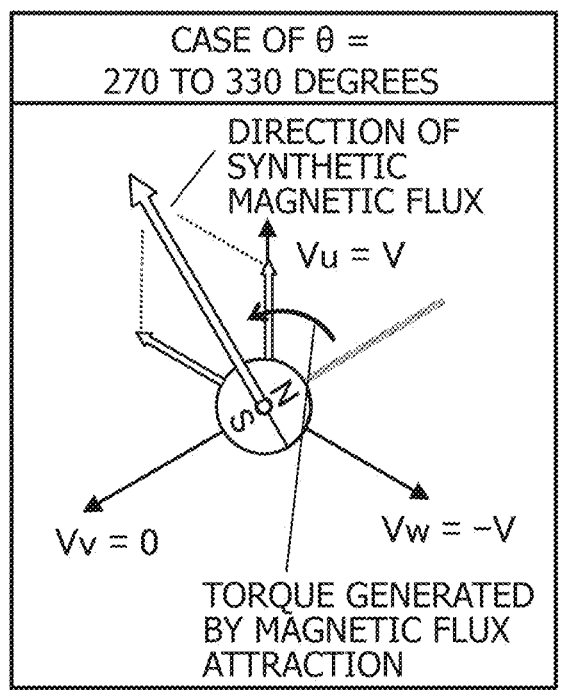
FIG. 5F is a schematic view illustrating a motor operation in the 120-degree energization method, in which the relationship between three-phase input voltages and magnetic fluxes, in a case in which the magnetic pole position of the rotor is within an angular range of 270 degrees to 330 degrees, is illustrated.

Each of FIGS. 5A to 5F is a schematic view illustrating a motor operation, in which the relationship between three-phase input voltages and magnetic fluxes in the corresponding angular range is illustrated. FIG. 5A illustrates the case of θ=−30 to +30 degrees, which corresponds to third energization mode M3. FIG. 5B illustrates the case of θ=30 to 90 degrees, which corresponds to fourth energization mode M4. FIG. 5C illustrates the case of θ=90 to 150 degrees, which corresponds to fifth energization mode M5. FIG. 5D illustrates the case of θ=150 to 210 degrees, which corresponds to sixth energization mode M6. FIG. 5E illustrates the case of θ=210 to 270 degrees, which corresponds to first energization mode M1. FIG. 5F illustrates the case of θ=270 to 330 degrees, which corresponds to second energization mode M2.

In this way, brushless motor 100 is driven to rotate by generating a magnetic flux by the three-phase input voltages and sequentially switching the direction of the synthetic magnetic flux by 60 degrees.

Figure 6B:
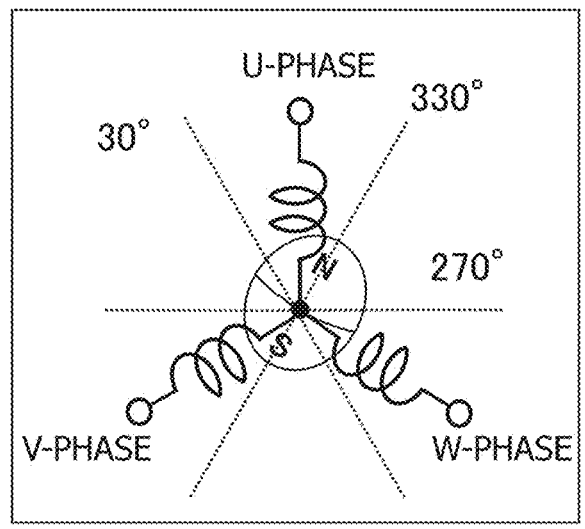
FIG. 6B is a schematic view for explaining the low-speed sensorless control of the brushless motor, in which the angle of the rotor of the brushless motor is 330 degrees.
Figure 6C:
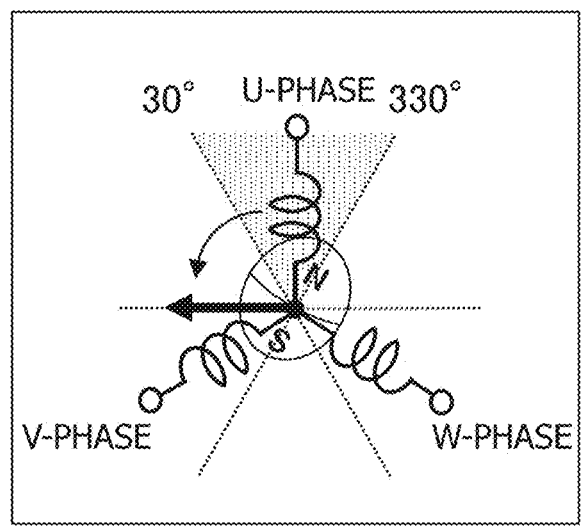
FIG. 6C is a schematic view for explaining the low-speed sensorless control of the brushless motor, in which the angle of the rotor of the brushless motor is 330 degrees to 30 degrees.

Each of FIGS. 6A to 6D is a schematic view for explaining the low-speed sensorless control. In the waveform diagram of FIG. 6A, there are indicated "6B", "6C" and "6D", which correspond to FIGS. 6B, 6C and 6D, respectively. In the low-speed sensorless control, as illustrated in FIG. 6A, an electromotive force generated in the open phase of the 120-degree energization is determined based on the non-linearity of the motor magnetic saturation characteristic, and the rotor angle (N pole center position) is estimated. Specifically, as illustrated in FIG. 6B, first, energization is performed from the U-phase to the V-phase to set the rotor angle of brushless motor 100 to 330 degrees. Next, as illustrated in FIG. 6C, the energization is performed from the V-phase to the W-phase to rotate brushless motor 100.

Figure 6D:
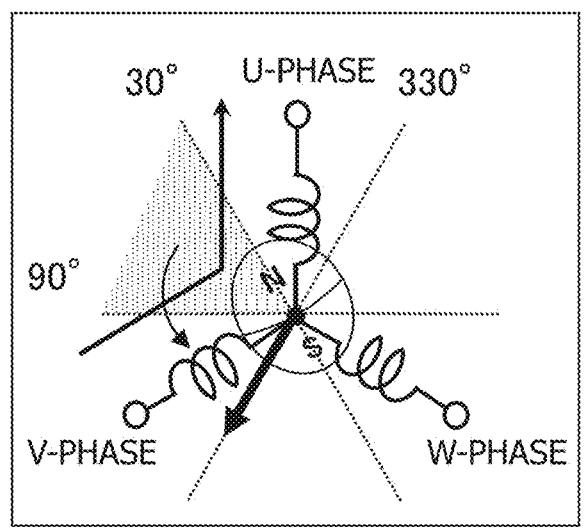
FIG. 6D is a schematic view for explaining the low-speed sensorless control of the brushless motor, in which the angle of the rotor of the brushless motor is 30 degrees to 90 degrees.

Then, as illustrated in FIG. 6D, when the open phase electromotive force reaches a predetermined value (threshold), the energized phases are switched (the predetermined value=electromotive force at rotor angle for switching energization of 30 degrees, 90 degrees, 150 degrees, 210 degrees, 270 degrees, or 330 degrees). Thereafter, the energized phases are switched every time the open phase electromotive force reaches the predetermined value.

Figure 7:
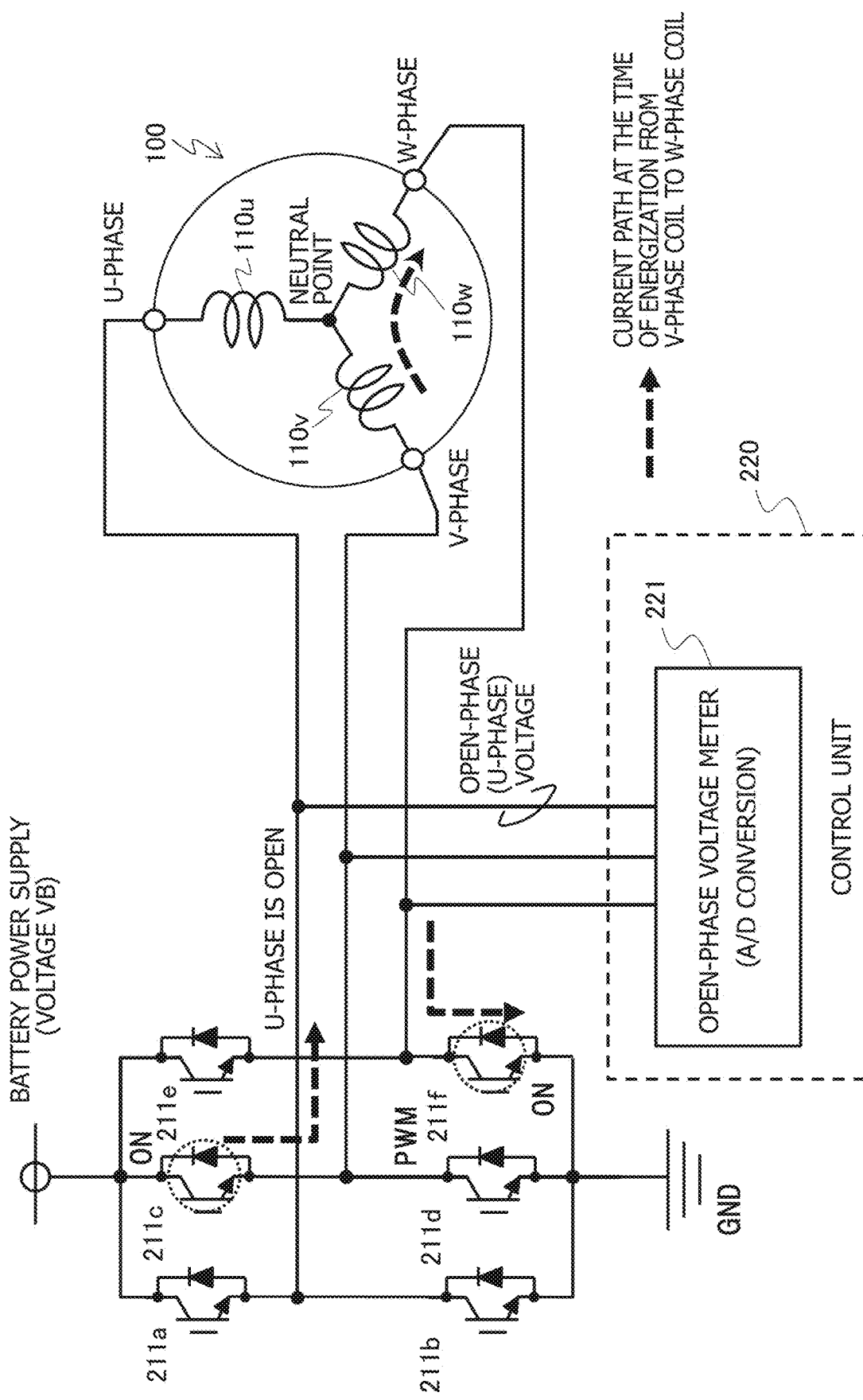
FIG. 7 is a circuit diagram for explaining the low-speed sensorless control of the brushless motor.

FIG. 7 illustrates a current path at the time of energization from the V-phase coil to the W-phase coil. When switching elements 211*c* and 211*f* are turned on, and switching elements 211*a*, 211*b*, 211*d* and 211*e* are turned off, a current flows from the battery power supply (voltage VB) to the ground (GND) via a collector and an emitter of switching element 211*c*, V-phase coil 110*v*, the neutral point, W-phase coil 110*w*, and a collector and an emitter of switching element 211*f*. The open-phase (U-phase) voltage at this time is measured by an open-phase voltage meter 221, and the obtained voltage value is A/D converted to estimate position information of rotor 120. Then, control unit 220 energizes under the PWM control to drive brushless motor 100 at extremely low rotational speed.

FIG. 8 is a view for explaining PWM output patterns and selection thereof. In the motor drive device according to the first embodiment, a PWM output pattern corresponding to the command duty cycle is selected from three PWM output patterns (patterns A, B, D).

These PWM output patterns are generated by control unit 220 illustrated in FIG. 3. When driving brushless motor 100 by drive device 200A, switching of the energization methods and switching of the PWM output patterns are performed according to the open-phase voltage measured by open-phase voltage meter 221 and an operation request of electric water pump 40.

Pattern A is used when voltage pulse width Dt of the command duty cycle (set duty cycle) is within a range of from maximum value max up to voltage pulse width Dmin of the minimum duty cycle (limit duty cycle). In this pattern A, energization is performed in the positive torque direction with voltage pulse width Dt of the command duty cycle in a major period, and energization is also performed in the positive torque direction with voltage pulse width Dt of the command duty cycle in a correction period.

Pattern B is used when voltage pulse width Dt of the command duty cycle is within a range of from a voltage pulse width that is less than voltage pulse width Dmin of the minimum duty cycle up to voltage pulse width (Dmin/2) of ½ of the minimum duty cycle. In this pattern B, energization is performed in the positive torque direction with voltage pulse width Dmin of the minimum duty cycle in the major period, and energization is performed in the positive torque direction with "Dt×2−Dmin" in the correction period. A pulse width obtained by averaging the voltage pulse width in the major period and the voltage pulse width in the correction period is voltage pulse width Dd of a drive duty cycle, and this voltage pulse width Dd corresponds to voltage pulse width Dt of the command duty cycle.

Pattern C is illustrated to compare a conventional PWM output pattern with pattern D of the present invention. Pattern C is used when voltage pulse width Dt of the command duty cycle is within a range of from a voltage pulse width less than ½ of the minimum duty cycle (Dmin/2) up to the minimum value min. In this pattern C, energization is performed in the positive torque direction with voltage pulse width Dmin of the minimum duty cycle in the major period, and energization is performed in the negative torque direction with "Dmin−Dt×2" in the correction period. Also in this case, a pulse width obtained by averaging the voltage pulse width in the major period and the voltage pulse width in the correction period is voltage pulse width Dd of the drive duty cycle, and this voltage pulse width Dd corresponds to voltage pulse width Dt of the command duty cycle.

Pattern D, similar to pattern C, is used when voltage pulse width Dt of the command duty cycle is within a range of from a voltage pulse width less than ½ of the minimum duty cycle (Dmin/2) up to the minimum value min. In this pattern D, energization is performed twice in the positive torque direction with voltage pulse width Dmin of the minimum duty cycle in the major period, and energization is performed twice in the negative torque direction with "Dmin−Dt" in the correction period. A pulse width obtained by averaging the voltage pulse width in two periods of the major period and the voltage pulse width in two periods of the correction period is voltage pulse width Dd of the drive duty cycle, and this voltage pulse width Dd corresponds to voltage pulse width Dt of the command duty cycle.

Figure 9:
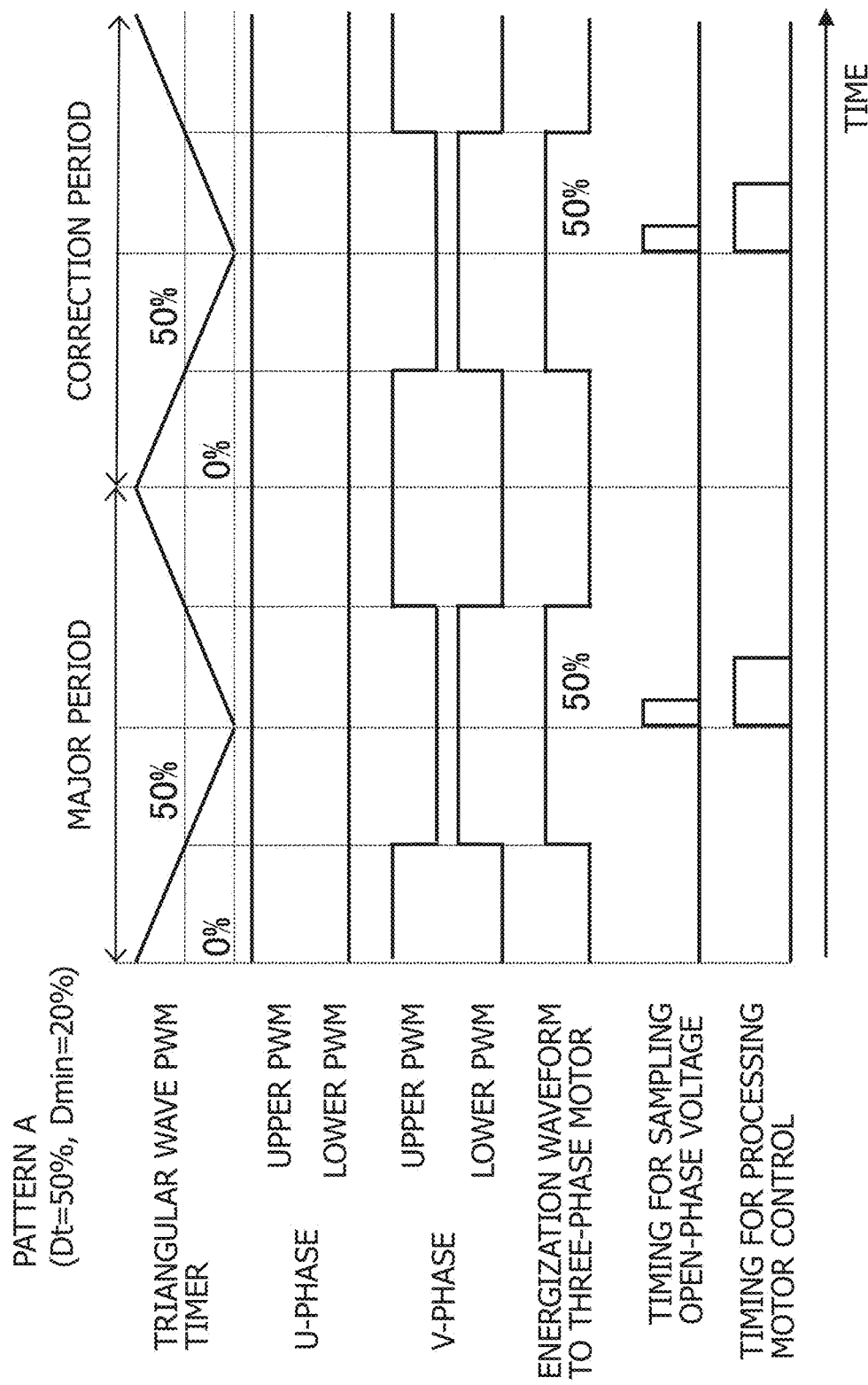
FIG. 9 is a waveform diagram illustrating a first PWM output pattern (pattern A).

FIG. 9 is a waveform diagram of a first PWM output pattern (pattern A), in which the command duty cycle is 50% (Dt=50%) and the minimum duty cycle is 20% (Dmin=20%). At this time, since the energization waveform has the duty cycle of 50% in both the major period and the correction period of brushless motor 100, the minimum duty cycle is not relevant. At every valley of triangular wave in both the major period and the correction period, there is set the timing for sampling the open-phase voltage, and sampling timings, twice in the figure, correspond to motor control processing timings.

Figure 10:
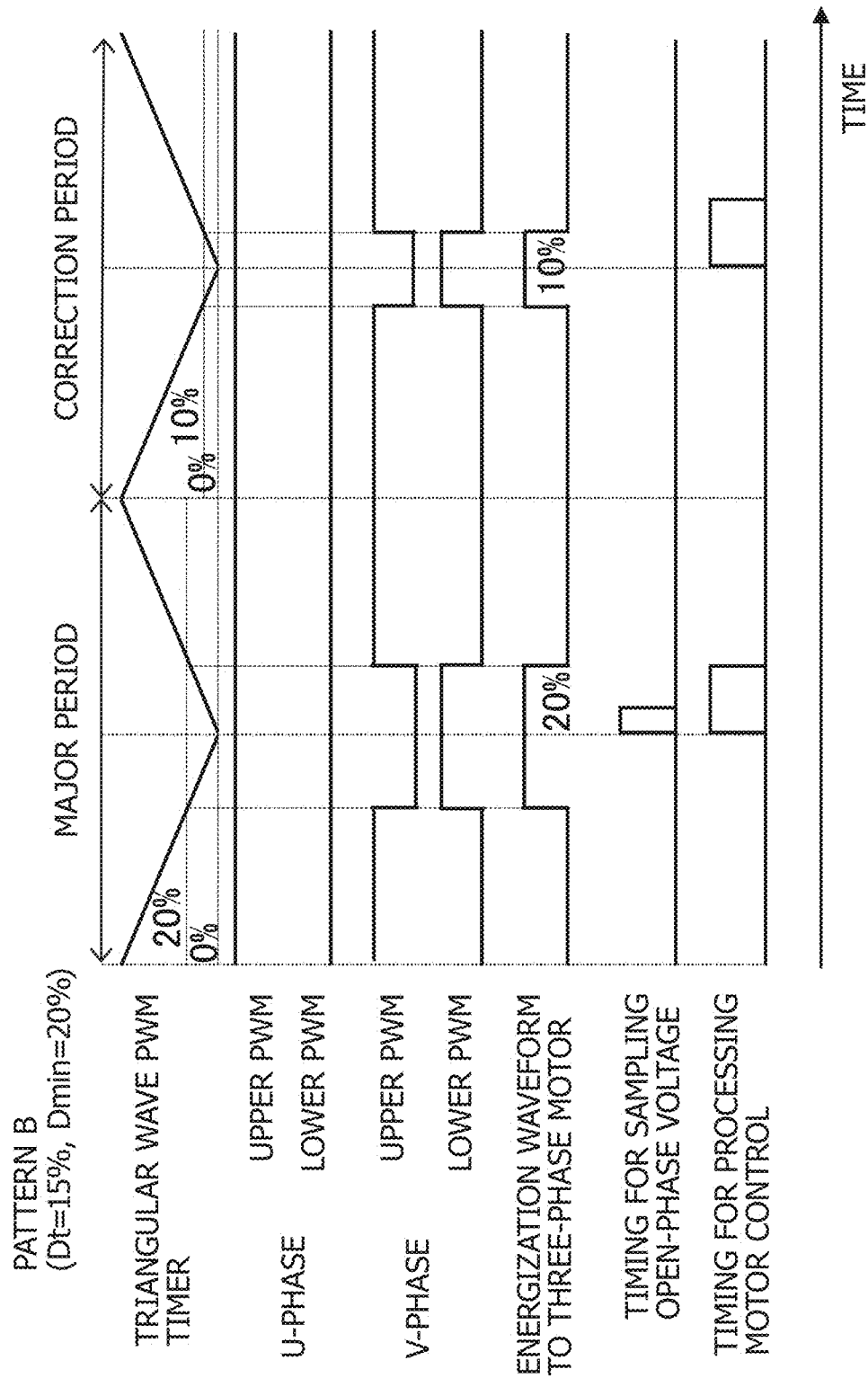
FIG. 10 is a waveform diagram illustrating a second PWM output pattern (pattern B).

FIG. 10 is a waveform diagram of a second PWM output pattern (pattern B), in which the command duty cycle is 15% (Dt=15%) and the minimum duty cycle is 20% (Dmin=20%). At this time, since the command duty cycle is less than the minimum duty cycle, the energization waveform applied to brushless motor 100 in the major period has a duty cycle of 20% (minimum duty cycle), and the energization waveform in the correction period (correction duty cycle) has a duty cycle of 10% (Dr=10%). This results in a drive duty cycle of 15% (Dd=15%), which is obtained by averaging the duty cycle of 20% in the major period and the duty cycle of 10% in the correction period. Here, the sampling timing of the open-phase voltage is set at the time corresponding to a valley of the triangular wave in the major period (i.e., once), and the processing timing of the motor control is set at every valley of the triangular wave in both the major period and the correction period (i.e., twice).

Figure 11:
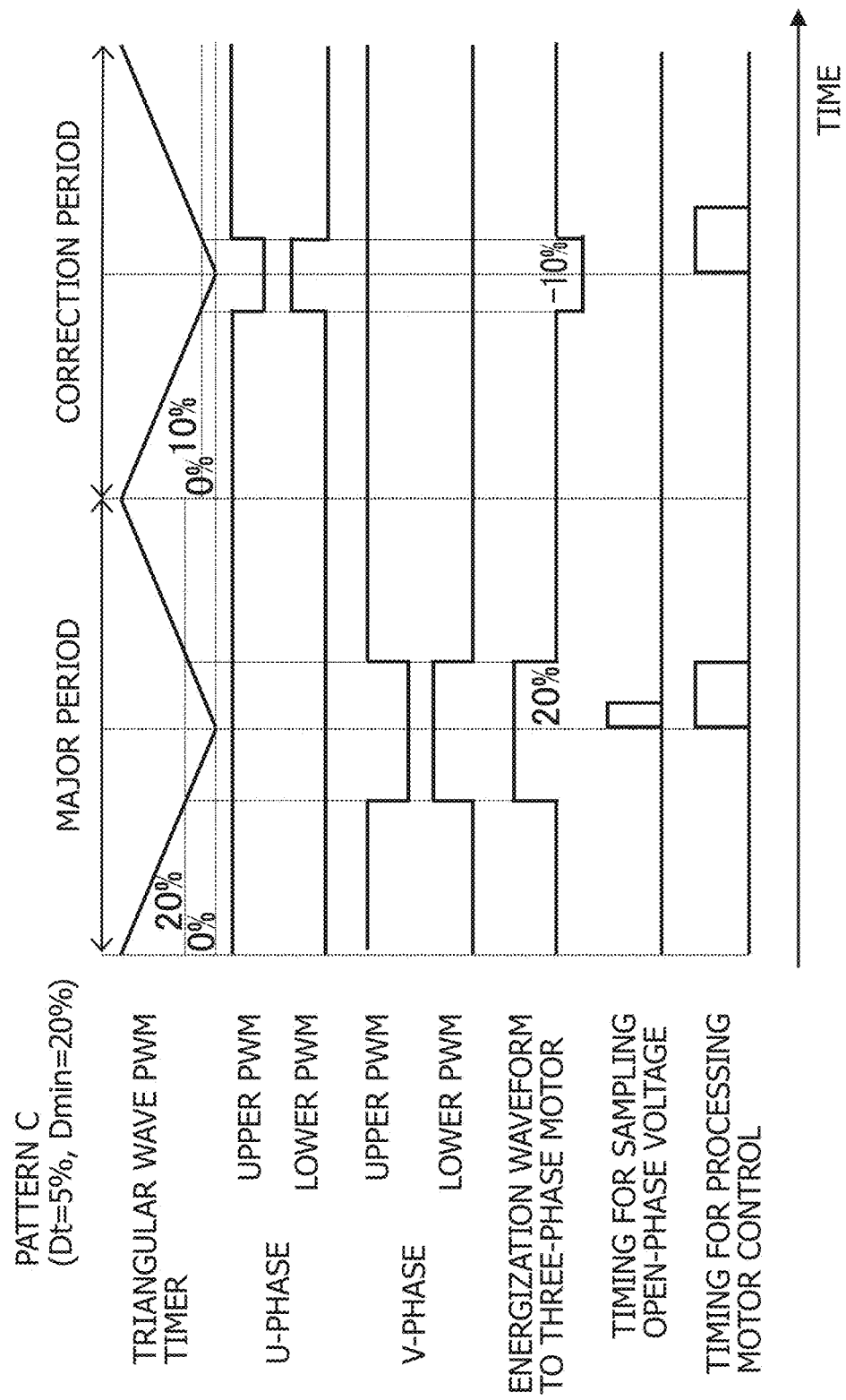
FIG. 11 is a waveform diagram illustrating a third PWM output pattern (pattern C).

FIG. 11 is a waveform diagram of a third PWM output pattern (pattern C), in which the command duty cycle is 5% (Dt=5%) and the minimum duty cycle is 20% (Dmin=20%). This pattern C is a reference example described in comparison with pattern D of the present invention to make the present invention more easily understandable. Conventionally, drive control of brushless motor 100 has been performed by combining patterns A, B and C.

At this time, since the command duty cycle is less than the minimum duty cycle, the energization waveform applied to brushless motor 100 in the major period has a duty cycle of 20% (minimum duty cycle), and the energization waveform in the correction period (correction duty cycle) has a duty cycle of −10%. This results in a drive duty cycle of 5% (Dd=5%), which is obtained by averaging the difference between the minimum duty cycle of 20% and the correction duty cycle of −10%. Here, the open-phase voltage is sampled once at the time corresponding to the valley of the triangular wave in the major period, and the motor control processing is performed twice, that is, at every time corresponding to the valleys in the triangular wave in both the major period and the correction period.

Thus, conventionally, in the pulse shift control, the period for measuring the pulse induced voltage is limited to the minimum duty cycle in the major period, and the correction duty cycle is set to the voltage pulse width of the drive duty cycle obtained by averaging the voltage pulse width of the minimum duty cycle and the voltage pulse width of the correction duty cycle, in the correction period. This makes it possible to obtain the pulse induced voltage of the non-energized phase after convergence of the ringing due to the turning on/off operation of switching elements 211a to 211f However, the position determination frequency is only once in two periods of the major period and the correction period.

Figure 12:
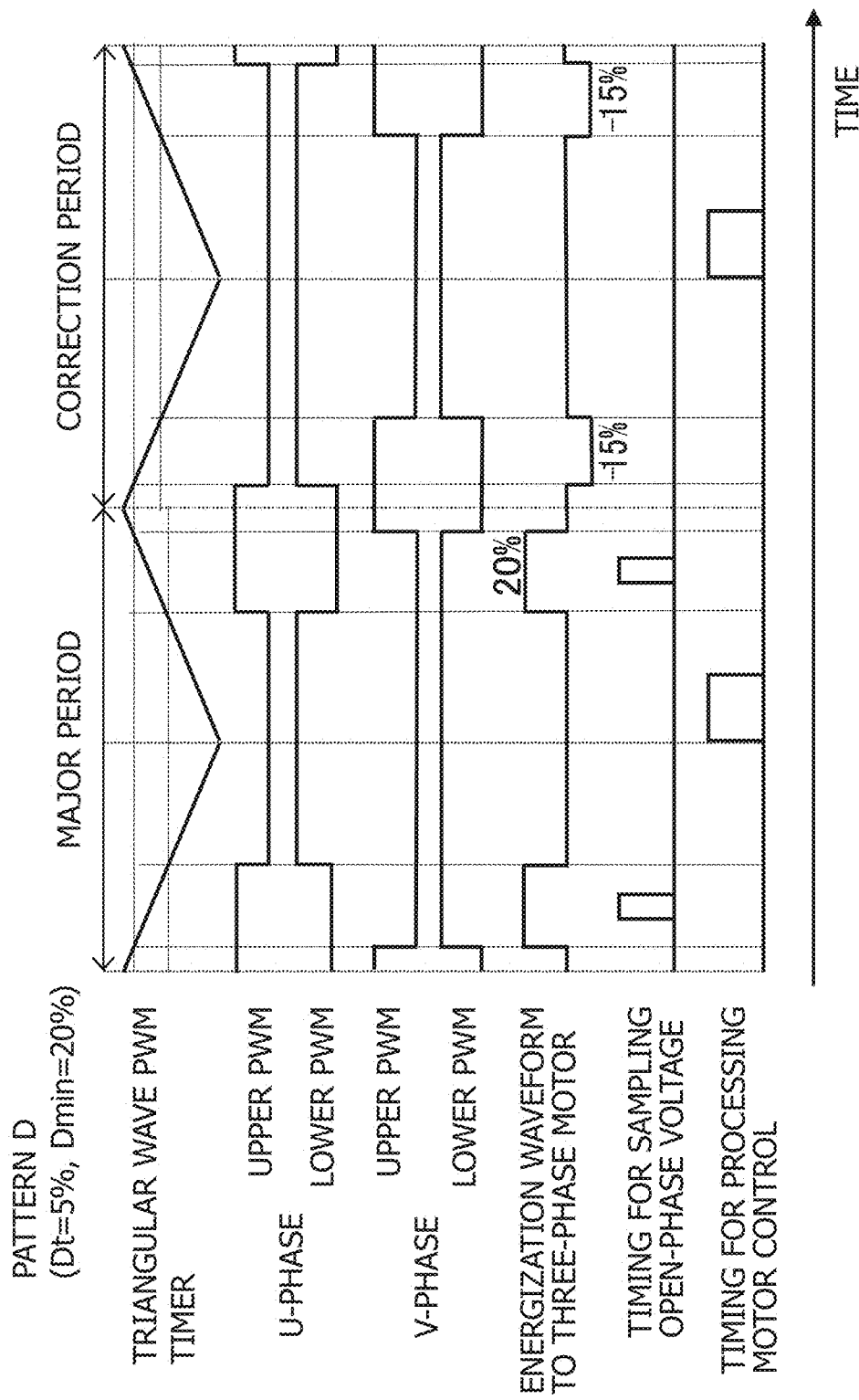
FIG. 12 is a waveform diagram illustrating a fourth PWM output pattern (pattern D).

FIG. 12 is a waveform diagram of a fourth PWM output pattern (pattern D), in which the command duty cycle is 5% (Dt=5%) and the minimum duty cycle is 20% (Dmin=20%). At this time, since the command duty cycle is less than the minimum duty cycle, the energization waveform applied to brushless motor 100 in the major period has a duty cycle of 20% (minimum duty cycle) and brushless motor 100 is energized twice, and the energization waveform in the correction period has a duty cycle (correction duty cycle) of −15% and brushless motor 100 is energized twice. This results in a drive duty cycle of 5% (Dd=5%), which is obtained by averaging the difference between (20% minimum duty cycle)×2 and (15% correction duty cycle)×2.

In this pattern D, sampling of the open-phase voltage is performed twice near peaks of the triangular wave on both sides in the major period, and the motor control processing timing is set at the times corresponding to the valleys of the triangular wave in the major period and the correction period, and the motor control processing is performed twice. Thus, when brushless motor 100 is driven at extremely low rotational speed with the voltage pulse width that is within a range of from a voltage pulse width of less than Dmin/2 up to the minimum value min, it is possible to increase the position determination frequency compared with pattern C, so that it is possible to suppress the decrease in rotational accuracy and controllability.

Voltage pulse width Dt of the command duty cycle and voltage pulse width Dmin of the minimum duty cycle, described above, are set by major period duty setting unit 318 and correction period duty setting unit 320. Then, gate signal switching unit 306 supplies a gate signal to the switching elements 211a to 211f so that duty correcting unit 322 corrects the duty cycle of the PWM signal generated by PWM generating unit 304, and the drive control of brushless motor 100 is performed by combining the abovementioned patterns A, B and D.

Figure 13:
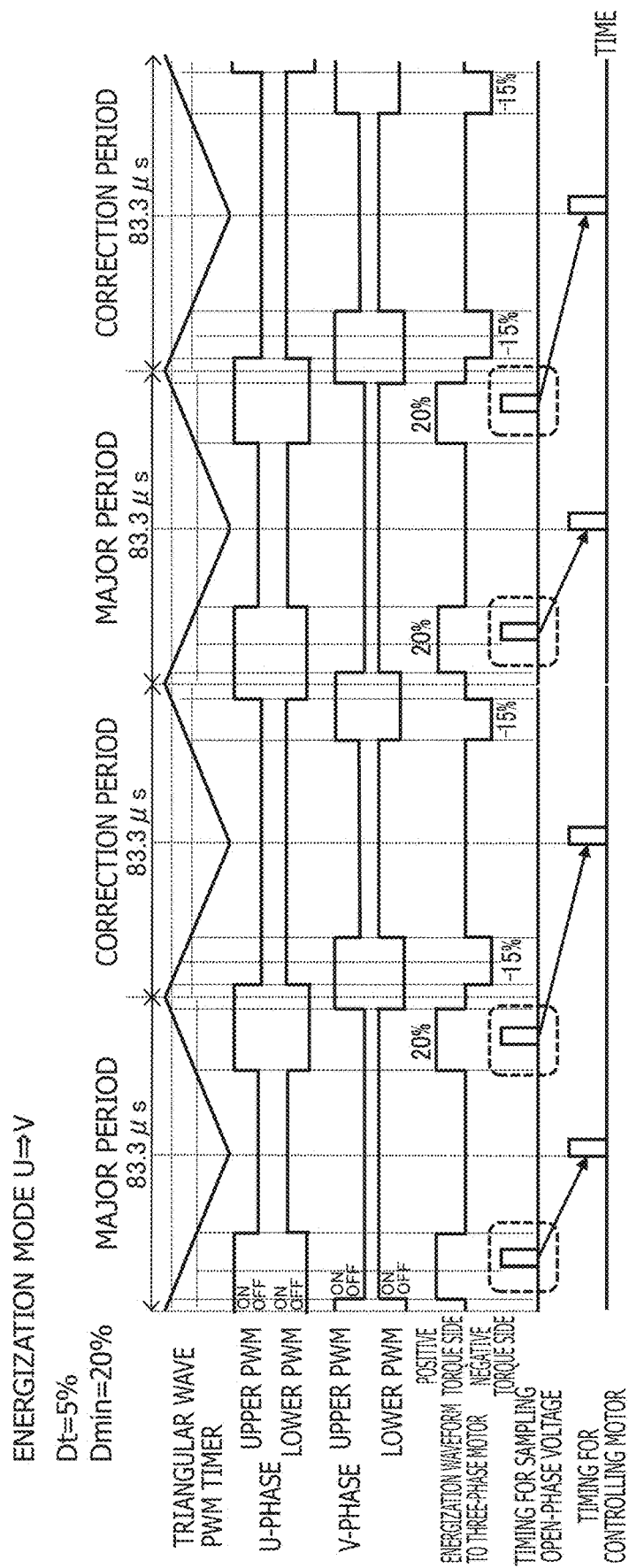
FIG. 13 is a waveform diagram illustrating an example of a drive method of the brushless motor according to the first embodiment of the present invention.
Figure 14:
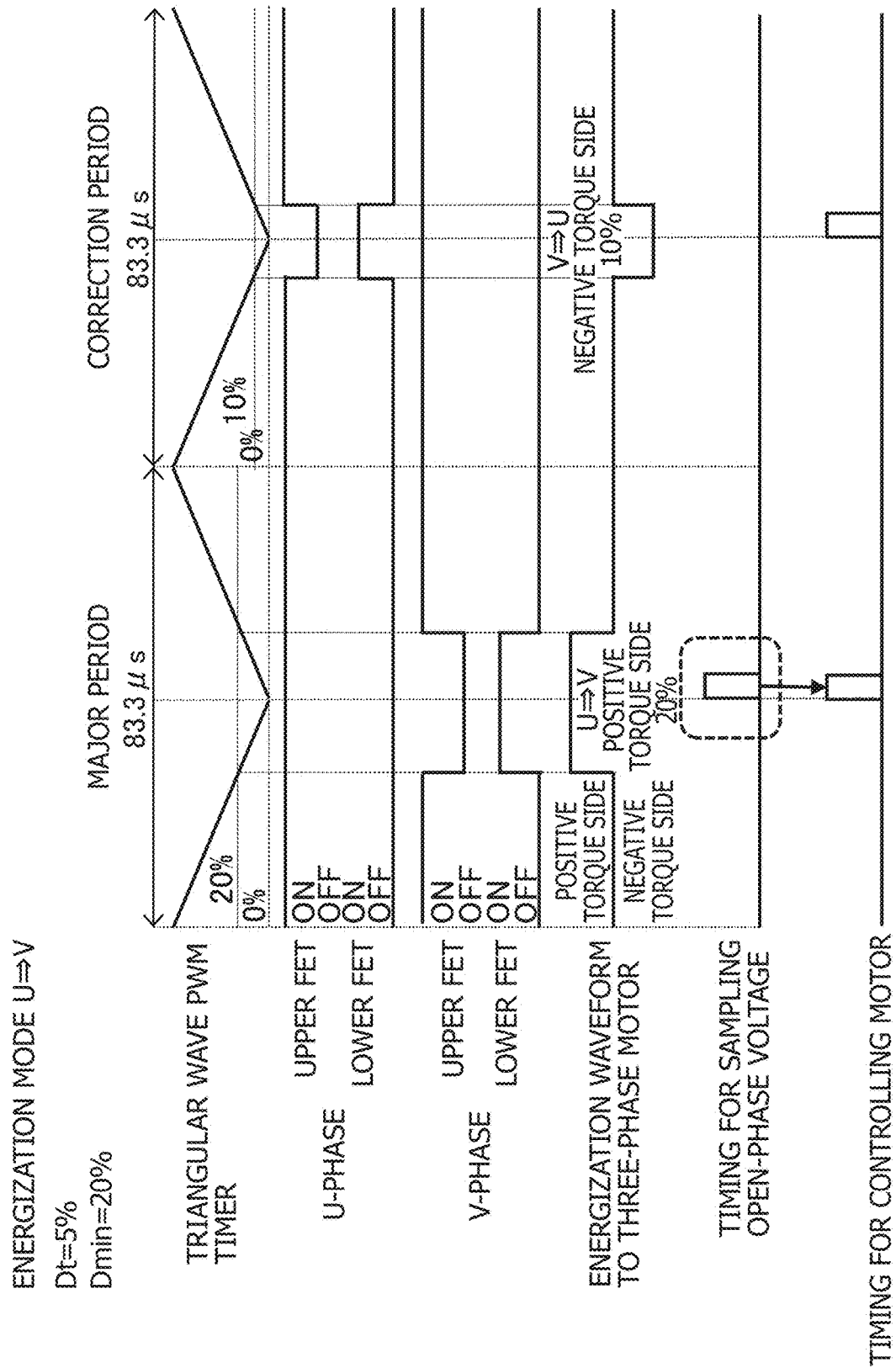
FIG. 14 is a waveform diagram illustrating a conventional drive method of a brushless motor.

FIG. 13 is a waveform diagram illustrating an example of a drive method of the brushless motor according to the first embodiment of the present invention. FIG. 14 illustrates a waveform diagram of a conventional drive method to compare with the present invention. FIGS. 13 and 14 illustrate, as an example, a case in which there are selected the energization mode causing a current to flow from the U-phase coil to the V-phase coil, the PWM output pattern (pattern D or C) in which the command duty cycle is 5% and the minimum duty cycle is 20%, and the PWM output period of 83.3 μs (PWM carrier frequency of 12 kHz).

In the first embodiment, as illustrated in FIG. 13, sampling of the open-phase voltage is performed twice near peaks of the triangular wave on both sides in the major period, and correction is performed twice at timings near peaks of the triangular wave on both sides in the correction period. Then, the motor control is performed at the times corresponding to the valleys of the triangular wave in the major period and the correction period, using the position determination results obtained when the open-phase voltage is sampled. Thus, in the pulse shift control, since the position determination is performed twice in two periods of the PWM signal, it is possible to increase the position determination frequency. Therefore, it is possible to suppress the decrease in rotational accuracy and controllability at the time of driving at extremely low rotational speed.

On the other hand, conventionally, as illustrated in FIG. 14, sampling of the open-phase voltage is performed once at the time corresponding to the valley of the triangular wave in the major period, and the motor control is performed at the time corresponding to the valleys of the triangular wave in the major period and the correction period, using this position determination result. Thus, at the time of driving at extremely low rotational speed, the frequency of position determination might be reduced, and this might result in the decrease in rotation accuracy and controllability of the brushless motor.

In the example illustrated in FIG. 13, sampling of the open-phase voltage is performed twice at timings near peaks of the triangular wave on both sides in the major period, and correction is performed twice at timings near the peaks of the triangular wave on both sides in the correction period.

That is, brushless motor 100 has an energization waveform indicating positive torque, positive torque, negative torque, and negative torque, in this order. Since such control can reduce the processing of control unit 220, the present invention may be applied even if control unit 220 using a microcomputer with relatively low processing power.

However, the timing for sampling the open-phase voltage and the timing for correction are not limited thereto. For example, if a microcomputer with a high processing capability is used, brushless motor 100 may have an energization waveform indicating positive torque, negative torque, positive torque, and negative torque, in this alternating fashion. In this case, intervals between the energization with the voltage pulse width of the minimum duty cycle and the energization of the voltage pulse width of the correction duty cycle may set to be shorter than the energization interval in the respective duty cycles.

Figure 15:
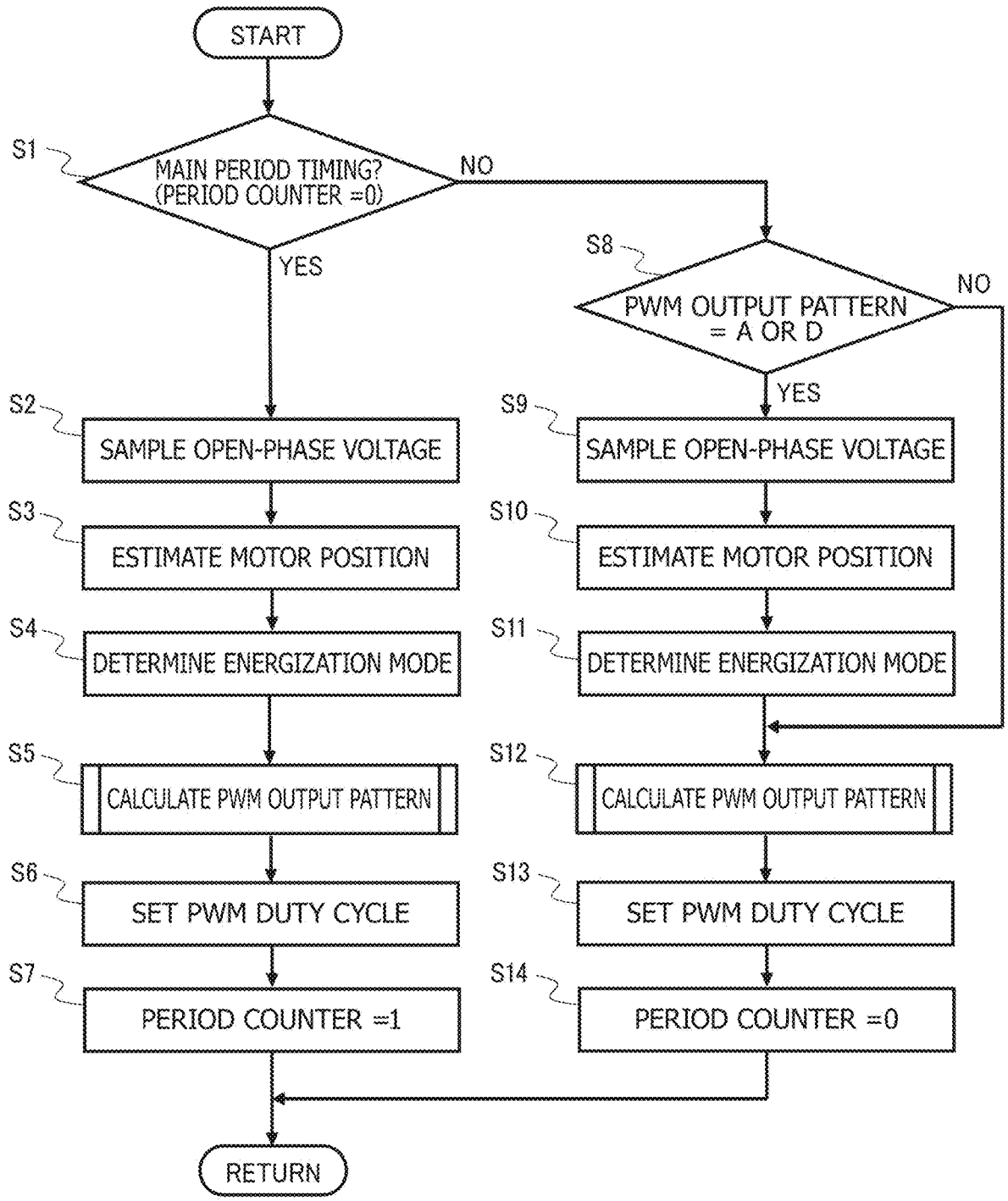
FIG. 15 is a flowchart illustrating the drive method of the brushless motor according to the first embodiment of the present invention.

FIG. 15 is a flowchart illustrating a drive method of the brushless motor according to the first embodiment of the present invention. First, it is determined whether it is during the major period (step S1). To perform this determination, for example, a period counter may be used, and when the period counter indicates 0, it is determined to be the major period. When it is determined to be the major period, the open-phase voltage is sampled by open-phase voltage meter 221 in an energization period in the PWM control (step S2), and then, the position of rotor 120 (motor position) is estimated based on the obtained voltage value (step S3).

Then, energization mode determining unit 308 determines the energization mode (step S4), and outputs a mode command signal for determining the energization mode of motor drive circuit 210. Subsequently, based on the command value of an applied voltage output from applied voltage calculating unit 302, PWM generating unit 304 calculates a PWM output pattern (step S5). The major period duty setting unit 318 sets the duty cycle of the PWM control, that is, voltage pulse width Dt of the command duty cycle (step S6), and duty correcting unit 322 corrects the duty cycle. Thereafter, the count value of the period counter is incremented to 1 (period counter=1) (step S7), and the process returns to determine the next period.

On the other hand, when it is determined in step S1 that it is not during the major period, that is, it is during the correction period, then it is determined whether the PWM output pattern is pattern A (or pattern D) (step S8). When it is determined that the PWM output pattern is either pattern A or pattern D, the open-phase voltage is sampled by open-phase voltage meter 221 in the energization period in the PWM control (step S9), and then, the position information of rotor 120 is estimated based on the obtained voltage value (step S10). Thereafter, energization mode determining unit 308 determines the energization mode (step S11), and outputs the mode command signal for determining the energization mode of motor drive circuit 210. Subsequently, based on the command value of the applied voltage output from applied voltage calculating unit 302, PWM generating unit 304 calculates a PWM output pattern (step S12). When it is determined in step S8 that the PWM output pattern is neither pattern A nor pattern D, the process proceeds to step S12 to calculate a PWM output pattern.

In subsequent step S13, the correction period duty setting unit 320 sets the duty cycle of the PWM control, that is, voltage pulse width Dr of the correction duty cycle, and duty correcting unit 322 corrects the duty cycle. Next, the count value of the period counter is decremented to 0 (period counter=0), and the process returns to determine the next period.

Thus, since the open-phase voltage is obtained when the period counter indicates 0 and when the PWM output pattern is either pattern A or pattern D, position information can be obtained twice in two periods of the PWM signal. Therefore, it is possible to suppress the decrease in rotational accuracy and controllability at the time of driving at extremely low rotational speed.

Second Embodiment

Figure 16:
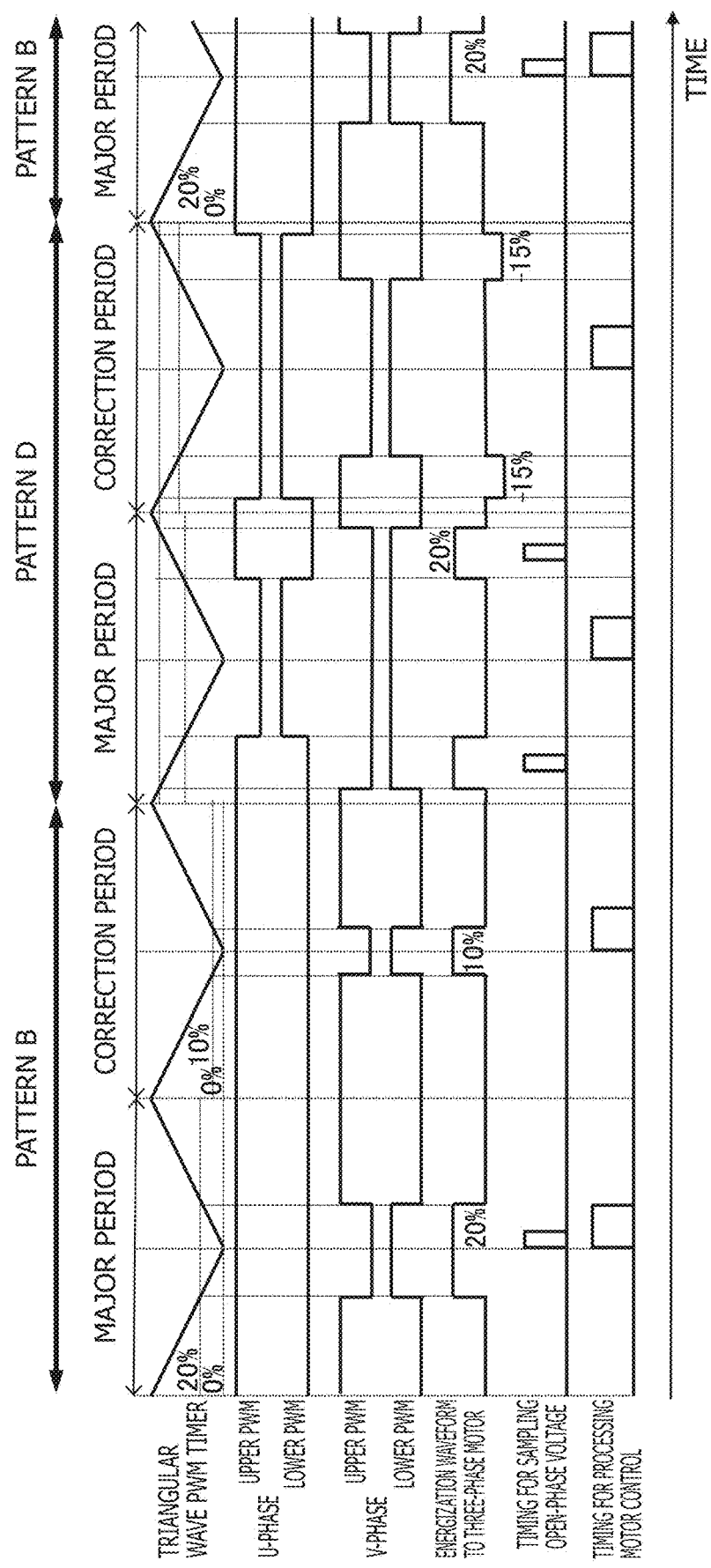
FIG. 16 is a waveform diagram illustrating an example of a drive method of the brushless motor according to a second embodiment of the present invention.

FIG. 16 is a waveform diagram illustrating an example of a drive method of the brushless motor according to a second embodiment of the present invention. In the second embodiment, switching between energization with voltage pulse width Dmin of the minimum duty cycle and energization with voltage pulse width Dr of the correction duty cycle is performed, when switching between energization patterns is performed. For example, as illustrated in FIG. 16, in a case in which the energization patterns are switched to be in the order pattern B, pattern D, and pattern B, the timing at which switching between the energization with the minimum duty cycle and the energization with the correction duty cycle is performed, is made to coincide with the switching timing of the energization patterns. In other words, switching between the PWM output patterns is performed at the time the switching between the energization modes is performed, rather than in the middle of an energization mode. This is because when switching between the PWM output patterns is performed in the middle of an energization mode, energization intervals may change at every switching, which might cause vibration and noise.

Figure 17:
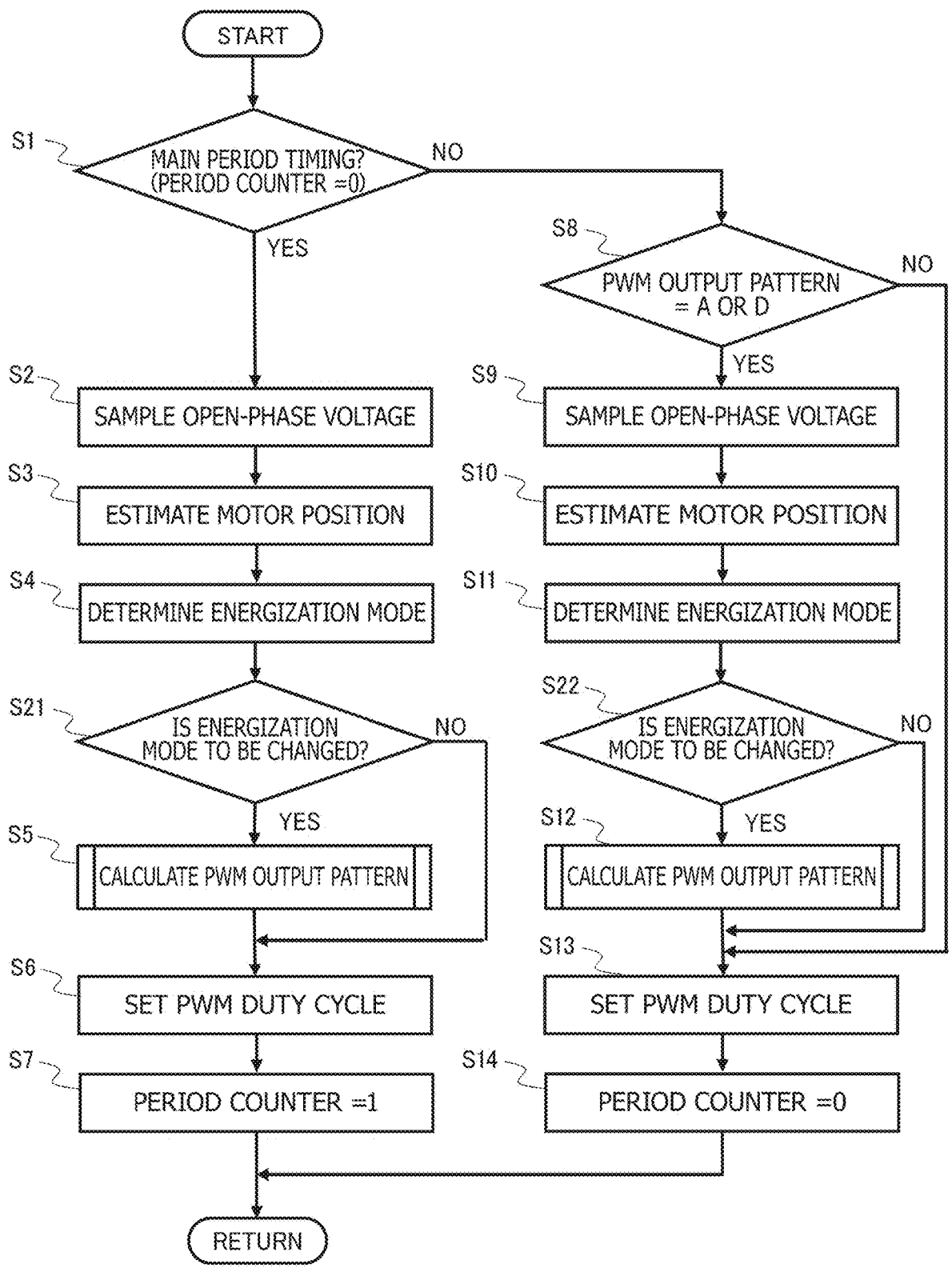
FIG. 17 is a flowchart illustrating the drive method of the brushless motor according to the second embodiment of the present invention.

FIG. 17 is a flowchart illustrating the drive method illustrated in FIG. 16. First, it is determined whether it is during the major period (step S1). To perform this determination, for example, a period counter may be used, and when the period counter indicates 0, it is determined to be the major period. When it is determined to be the major period, the open-phase voltage is sampled by open-phase voltage meter 221 in the energization period in the PWM control (step S2), and then, the position of rotor 120 (motor position) is estimated based on the obtained voltage value (step S3). Then, energization mode determining unit 308 determines the energization mode (step S4), and outputs a mode command signal for determining the energization mode of motor drive circuit 210.

Next, it is determined whether it is requested to change the energization mode based on the mode switching trigger signal output from comparing unit 310 (step S21). When there is a request for mode change, PWM generating unit 304 calculates the PWM output pattern based on the command value of the applied voltage output from applied voltage calculating unit 302 (step S5), and then, the duty cycle of the PWM control is set (step S6). The duty cycle is set by setting voltage pulse width Dt of the command duty cycle by major period duty setting section 318, and by correcting the duty cycle by duty correcting unit 322. When it is determined in step S21 that there is no request for mode change, the duty cycle of PWM control is set without changing the PWM output pattern (step S6). Subsequently, the count value of the period counter is incremented to 1 (period counter=1) (step S7), and the process returns to determine the next period.

On the other hand, when it is determined in step S1 that it is not during the major period (i.e., during the correction period), then it is determined whether the PWM output pattern is pattern A (or pattern D) (step S8). When it is determined that the PWM output pattern is either pattern A or pattern D, the open-phase voltage is sampled by open-phase voltage meter 221 in the energization period in the PWM control (step S9), and then, the position information of rotor 120 is estimated based on the obtained voltage value (step S10). Thereafter, energization mode determining unit 308 determines the energization mode (step S11), and outputs the mode command signal for determining the energization mode of motor drive circuit 210.

Next, it is determined whether it is requested to change the energization mode based on the mode switching trigger signal output from comparing unit 310 (step S22). When there is a request for mode change, PWM generating unit 304 calculates the PWM output pattern based on the command value of the applied voltage output from applied voltage calculating unit 302 (step S12), and then, the duty cycle of the PWM control is set (step S13). When it is determined in step S8 that the PWM output pattern is neither pattern A nor pattern D, and when it is determined in step S22 that there is no request for mode change, the duty cycle of PWM control is set (step S13). The duty cycle is set by setting voltage pulse width Dr of the correction duty cycle by correction period duty setting unit 320, and by correcting the duty cycle by duty correcting unit 322. Next, the count value of the period counter is decremented to 0 (period counter=0) (step S14), and the process returns to determine the next period.

Thus, since the open-phase sampling value is obtained when the period counter indicates 0 and when the PWM output pattern is either pattern A or pattern D, position information can be obtained twice in two periods of the PWM signal. Therefore, it is possible to suppress the decrease in rotational accuracy and controllability at the time of driving at extremely low rotational speed. Furthermore, by switching between energization with voltage pulse width Dmin of the minimum duty cycle and energization with voltage pulse width Dr of the correction duty cycle is performed at the same time the switching between energization patterns is performed, it is possible to reduce vibration and noise. Since electric water pumps may be driven at extremely low rotational speed even while the engine is stopped due to idle reduction, or the like, the present invention capable of reducing noise is highly effective.

Third Embodiment

Figure 18:
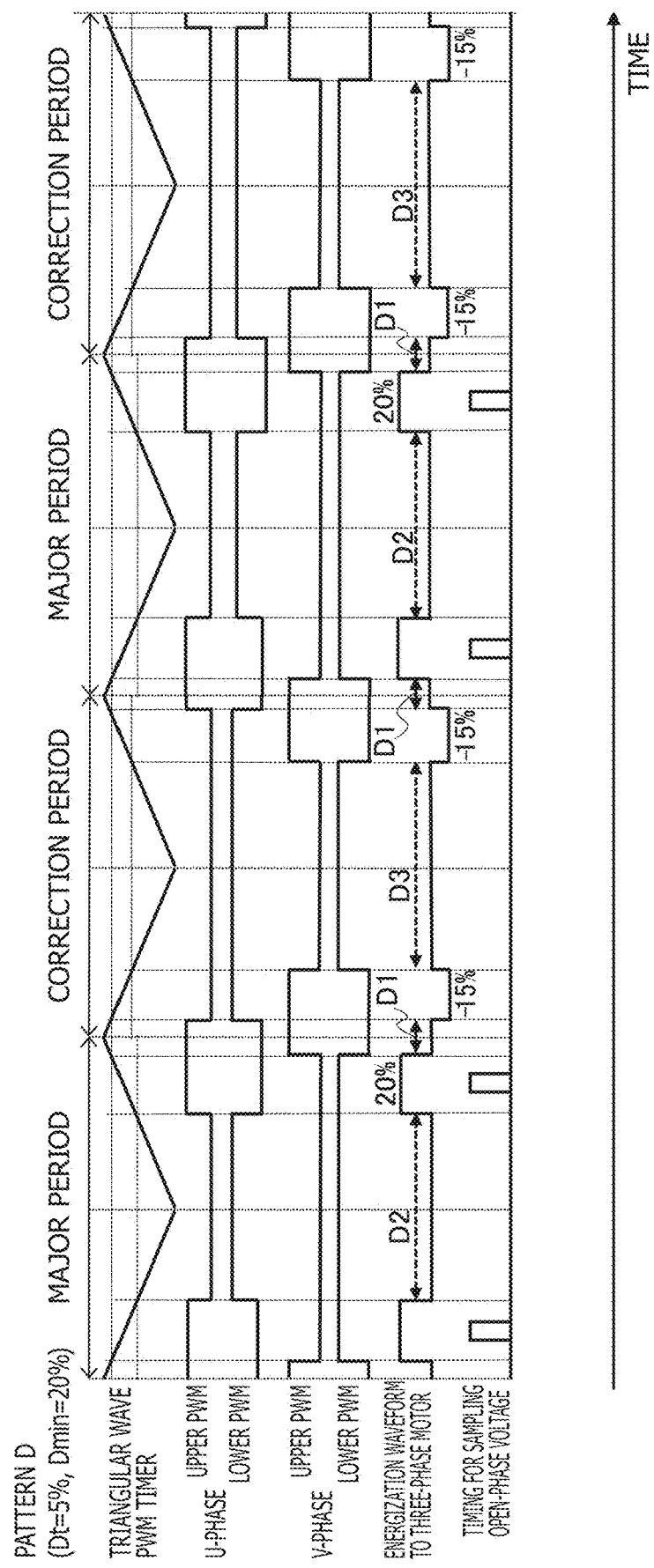
FIG. 18 is a waveform diagram illustrating an example of a drive method of the brushless motor according to a third embodiment of the present invention.

FIG. 18 is a waveform diagram illustrating an example of a drive method of the brushless motor according to a third embodiment of the present invention. In the third embodiment, an interval between the energization with voltage pulse width Dmin of the minimum duty cycle and the energization with voltage pulse width Dr of the correction duty cycle is set to be shorter than energization intervals in the respective duty cycles. Specifically, the energization waveform of brushless motor 100 has energization interval D1 between energization with a positive torque and next energization with a negative torque, which is shorter than interval D2 from energization with a positive torque to next energization with a positive torque, and interval D3 from energization with a negative torque to next energization with a negative torque. Thus, since energization is performed twice in one period of the PWM control and the energization intervals between energization in the positive torque direction and that in the negative torque direction is set to be shorter, it is possible to adjust the duty cycle by energizing in the negative torque direction, immediately after energizing in the positive torque direction. This makes is possible to reduce a torque variation synchronized with the carrier frequency.

Figure 19:
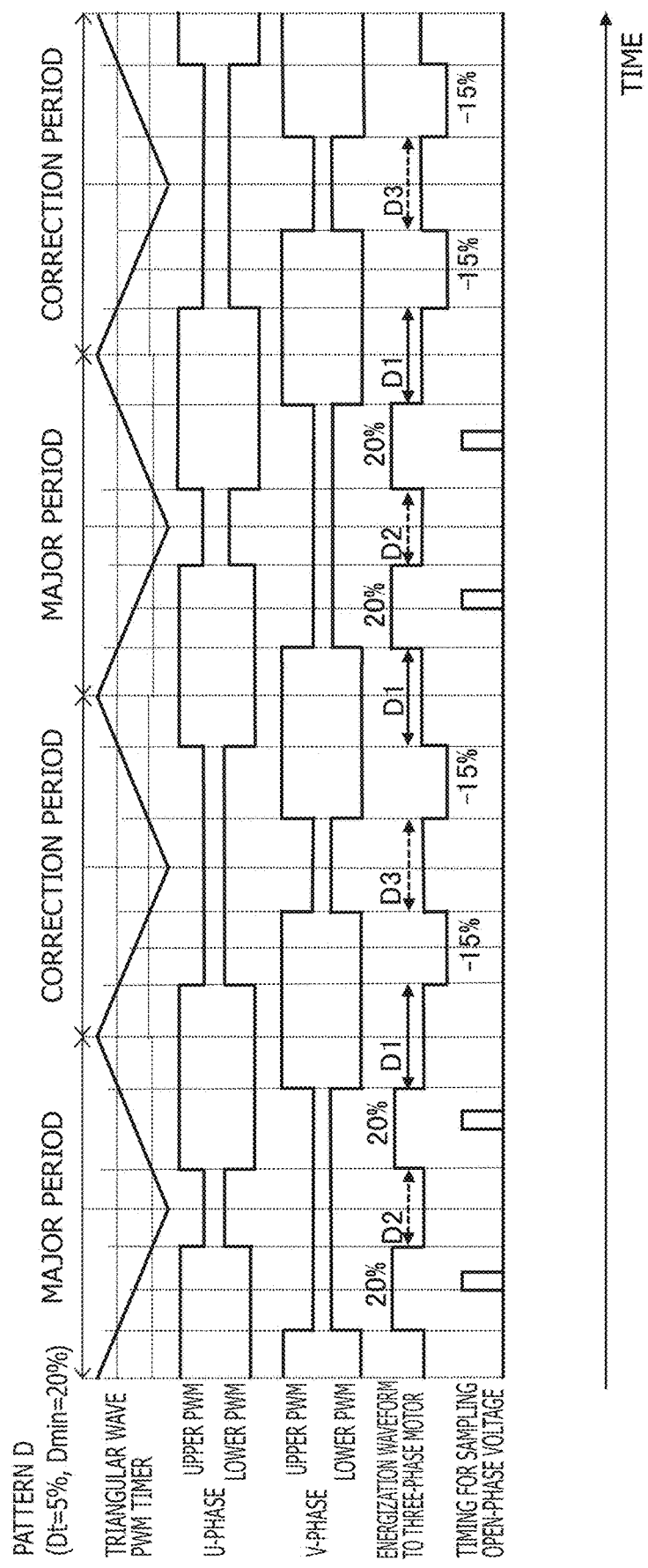
FIG. 19 is a waveform diagram illustrating a case in which an interval from energization with a positive torque to next energization with the positive torque is set to be shorter than an interval from energization with a negative torque to next energization with the negative torque.

FIG. 19 illustrates a waveform diagram in a case in which an interval from energization with a positive torque to next energization with a positive torque is set to be shorter than an interval from energization with a negative torque to next energization with a negative torque, compared with the waveform diagram of the present invention illustrated in FIG. 18. The energization waveform of brushless motor 100 has energization interval D1 between energization with a positive torque and energization with a negative torque, which is longer than interval D2 from energization with a positive torque to next energization with a positive torque and interval D3 from energization with a negative torque to energization with a negative torque. In this case, even if energization were performed twice in one period of the PWM control, correction delays, so that the positive torque and the negative torque become strong and the torque variation increases.

Figure 20A:
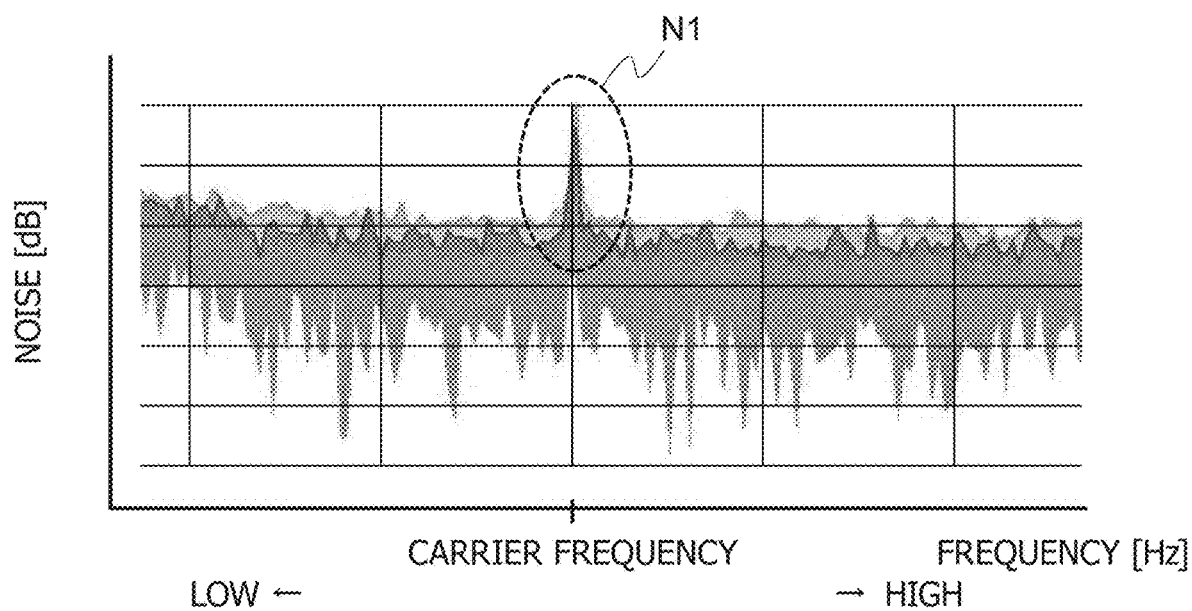
FIG. 20A is a characteristics chart for explaining noise which occurs near the carrier frequency, the chart illustrating spectrum analysis results of a conventional method.
Figure 20B:
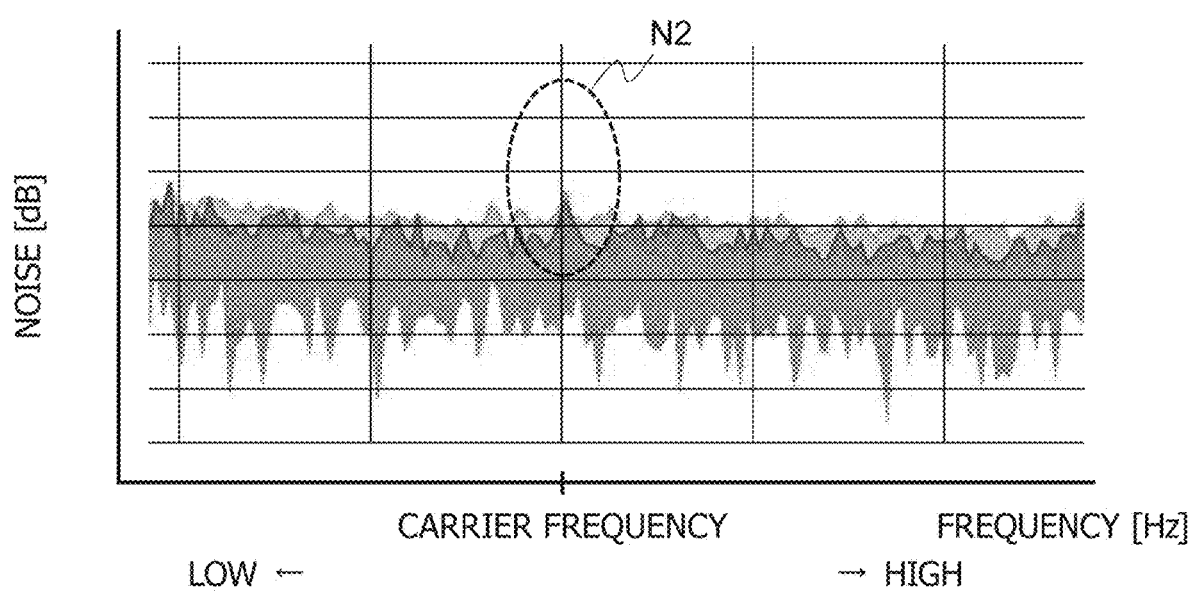
FIG. 20B is a characteristics chart for explaining noise which occurs near the carrier frequency, the chart illustrating spectrum analysis results of the present invention.

FIGS. 20A and 20B are charts for explaining reduction in noise which occurs near the carrier frequency, according to the third embodiment. FIG. 20A corresponds to a drive method according to a conventional pulse shift control, and FIG. 20B corresponds to the drive method according to the pulse shift control illustrated in the waveform diagram of FIG. 18. As indicated by a broken line N1 in FIG. 20A, unpleasant noise having a peak near the carrier frequency occurs in the conventional method. In contrast, according to the third embodiment, as indicated by a broken line N2 in FIG. 20B, there is no peak observed in the waveform near the carrier frequency, and reduction in noise was observed.

Fourth Embodiment

Figure 21A:
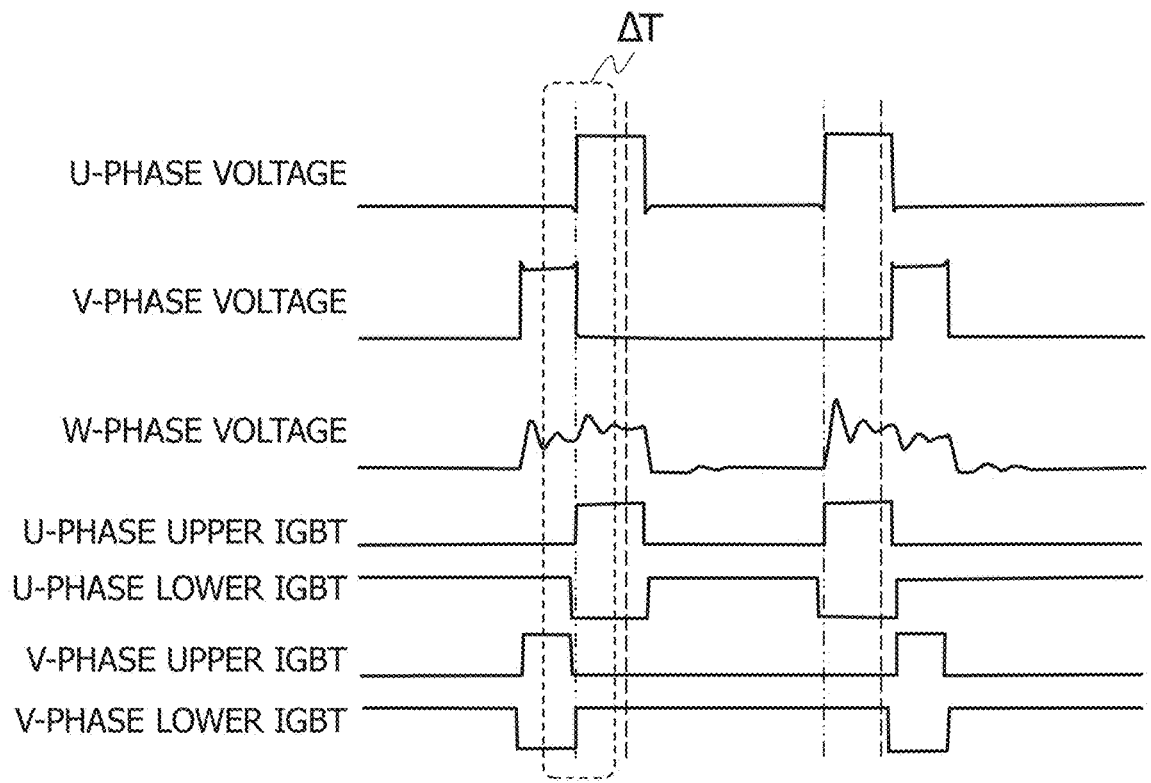
FIG. 21A is a waveform diagram for explaining a drive method of the brushless motor according to a fourth embodiment of the present invention.
Figure 21B:
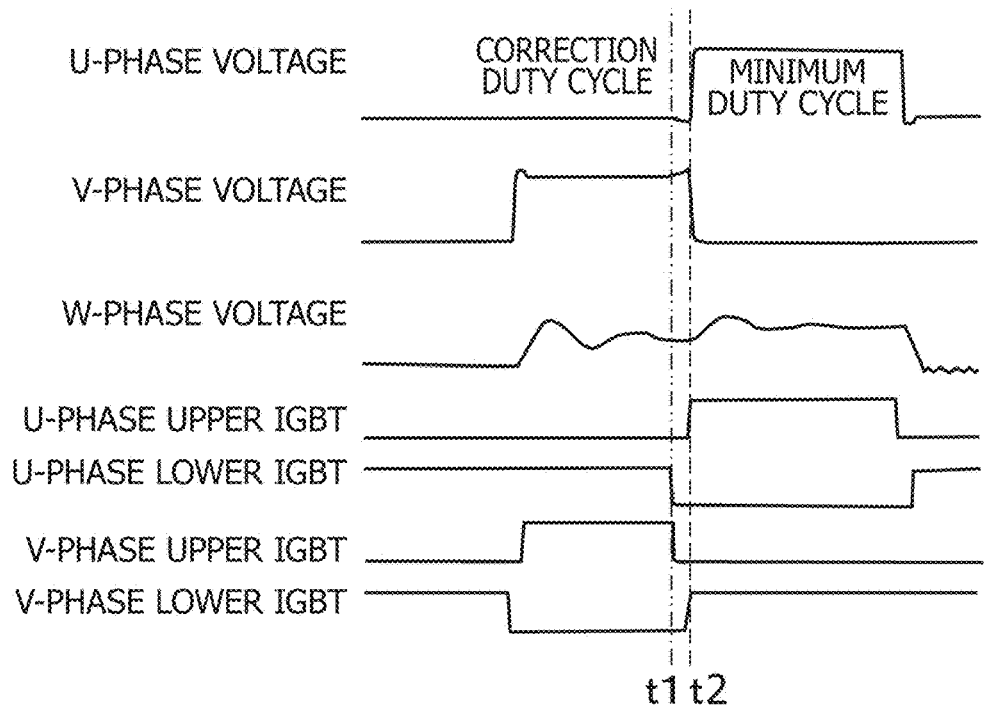
FIG. 21B is a waveform diagram for explaining the drive method of the brushless motor according to the fourth embodiment of the present invention.

FIGS. 21A and 21B are waveform diagrams for explaining a drive method of the brushless motor according to a fourth embodiment of the present invention. FIG. 21A illustrates the U-phase, the V-phase and the W-phase voltages, and gate voltage waveforms of a U-phase upper IGBT (switching element 211a), a U-phase lower IGBT (switching element 211b), a V-phase upper IGBT (switching element 211c) and a V-phase lower IGBT (switching element 211d). FIG. 21B is an enlarged view of a portion ΔT indicated by the broken line of FIG. 21A. In the fourth embodiment, the interval between energization with voltage pulse width Dmin of the minimum duty cycle and energization with voltage pulse width Dr of the correction duty cycle corresponds to dead time. That is, the interval is arranged to be equal to or to a substantially equal to the dead time.

In other words, both the timing for turning off the U-phase lower IGBT and the timing for turning off the V-phase upper IGBT are set to be at time t1 of FIG. 21B. This makes the timing for turning on the U-phase upper IGBT and the timing for turning on the V-phase lower IGBT coincide after the dead time has elapsed. This results in the shortest interval between energization with the minimum duty cycle and energization with the correction duty cycle, so that it is possible to maximize a noise reduction effect.

Fifth Embodiment

Figure 22A:
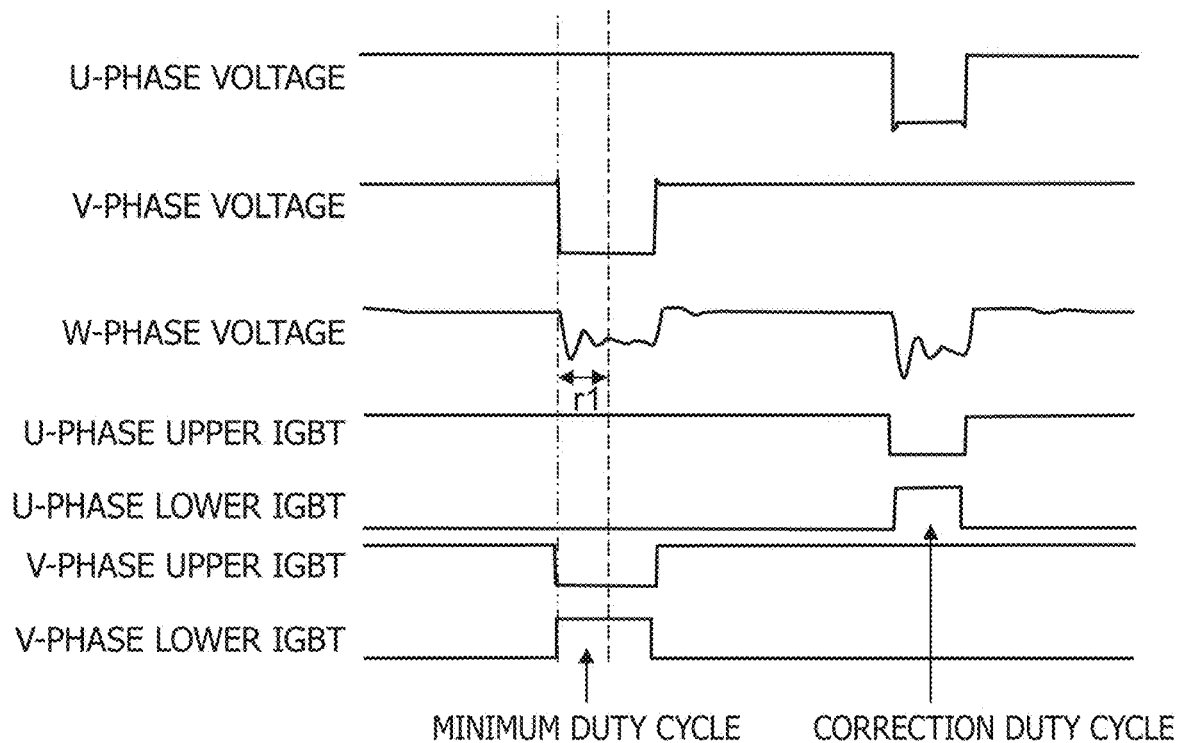
FIG. 22A is a waveform diagram for explaining a conventional drive method of a brushless motor.
Figure 22B:
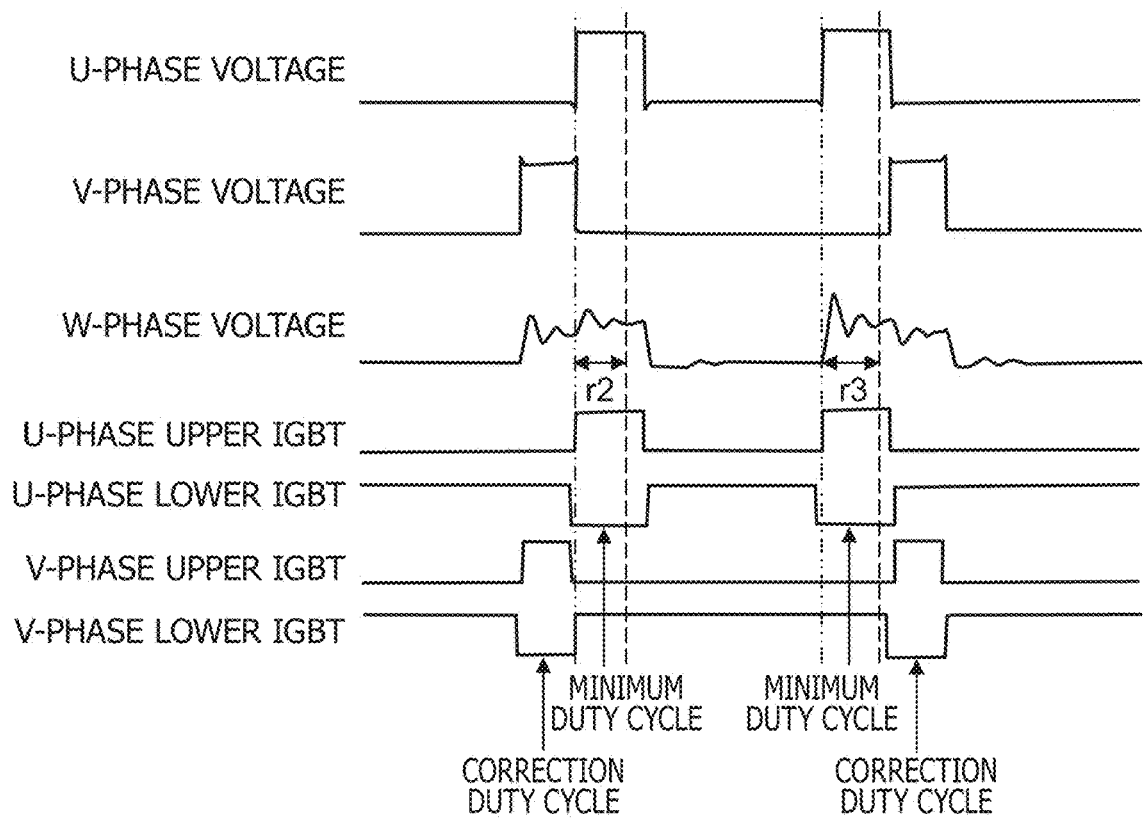
FIG. 22B is a waveform diagram for explaining a drive method of the brushless motor according to a fifth embodiment of the present invention.

FIG. 22A illustrates the U-phase, the V-phase, and the W-phase voltages, and gate voltage waveforms of the U-phase upper IGBT, the U-phase lower IGBT, the V-phase upper IGBT and the V-phase lower IGBT, according to a conventional drive method of a brushless motor. FIG. 22B is a waveform diagram for explaining a drive method of the brushless motor according to a fifth embodiment of the present invention, illustrating voltage waveforms compared with FIG. 21A. As illustrated in FIG. 22A, conventionally, a voltage pulse of the minimum duty cycle (limit duty cycle) and a voltage pulse of the correction duty cycle are spaced apart. In contrast, according to the fifth embodiment, a voltage pulse of the minimum duty cycle is arranged immediately after a voltage pulse of the correction duty cycle, or a voltage pulse of the correction duty cycle is arranged immediately after a voltage pulse of the minimum duty cycle. By arrange energization by a voltage pulse of the minimum duty cycle immediately after energization by a voltage pulse of the correction duty cycle, it is possible to shorten ringing width r2 of a voltage pulse of the minimum duty cycle with respect to conventional ringing width r1.

Although ringing width r3 in the minimum duty cycle in a case in which energization by the voltage pulse of the correction duty cycle is arranged immediately after energization by the voltage pulse of the minimum duty cycle, and is longer than ringing width r2, ringing width r3 is the same as conventional ringing width r1.

Thus, it is effective in shortening the ringing width to set the energization with the voltage pulse width in the minimum duty cycle immediately after the energization with the voltage pulse width in the correction duty cycle as a measurement target of the phase voltage. Furthermore, it is preferable that the pulse shift region be reduced in accordance with this enlarged measurable range.

Although, in the embodiments described above, the drive of the brushless motor for use to actuate the electric water pump is described as an example, the present invention may also be applied to a brushless motor for use to actuate the electric oil pump in a hydraulic pump system for a vehicle internal combustion engine. Of course, the present invention may also be applied to a pump for circulating fluids other than cooling water and oil.

Furthermore, the present invention may also be applied to all electric actuators using low-speed sensorless control, and it is not limited to those for vehicles as long as pulse shift control is performed at the time of driving an actuator at extremely low rotational speed.

REFERENCE SYMBOL LIST

10 Internal combustion engine
20 Transmission
30 Flow control valve
40 Electric water pump
100 Brushless motor (three-phase DC brushless motor)
110u, 110v, 110w Three-phase coils
120 Permanent magnet rotor (rotor)
211a to 211f Switching elements
200 Control device
200A Motor drive device
210 Motor drive circuit
220 Control unit
Dt Voltage pulse width of command duty cycle (set duty cycle)
Dmin Voltage pulse width of minimum duty cycle
Dr Voltage pulse width of correction duty cycle
Dd Voltage pulse width of drive duty cycle

The invention claimed is:
1. A drive device of a three-phase brushless motor, comprising a control unit configured to measure an open-phase voltage in an energization period in pulse width modulation control of the three-phase brushless motor, con- figured to estimate position information of a rotor based on the measured voltage value, and configured to control a voltage applied to the three-phase brushless motor,
  wherein when a voltage pulse width of a set duty cycle is less than or equal to a predetermined value, the control unit performs energization with a voltage pulse width of a minimum duty cycle twice in one period of pulse width modulation, the minimum duty cycle being capable of measuring a pulse induced voltage in a non-energized phase, and the control unit performs energization with a voltage pulse width of a correction duty cycle twice in next one period of the pulse width modulation, so that the control unit performs energization with a voltage pulse width of a drive duty cycle corresponding to the set duty cycle, on average in two periods,
  wherein when driving the three-phase brushless motor by performing energization by the pulse width modulation control, the control unit performs pulse shift control when a set duty cycle of an energized phase is less than or equal to a predetermined value, the pulse shift control including the energization with the voltage pulse width of the minimum duty cycle capable of measuring the pulse induced voltage in the non-energized phase, and the energization with the voltage pulse width of the correction duty cycle,
  wherein the control unit performs the energization with the voltage pulse width of the minimum duty cycle and the energization with the voltage pulse width of the correction duty cycle from a major period to a correction period of the pulse width modulation control, and the control unit sets an interval between the energization with the voltage pulse width of the minimum duty cycle and the energization with the voltage pulse width of the correction duty cycle, to be shorter than energization intervals in the respective duty cycles.

2. The drive device of the brushless motor according to claim 1, wherein the control unit performs switching between the energization with the voltage pulse width of the minimum duty cycle and the energization with the voltage pulse width of the correction duty cycle, when switching between PWM output patterns is performed.

3. The drive device of the brushless motor according to claim 1, wherein the control unit sets a length of the interval between the energization with the voltage pulse width of the minimum duty cycle and the energization with the voltage pulse width of the correction duty cycle, to be equal to duration of dead time.

4. The drive device of the brushless motor according to claim 3, wherein the control unit sets the energization with the voltage pulse width of the minimum duty cycle immediately after the energization with the voltage pulse width of the correction duty cycle as a measurement target of the phase voltage.

5. The drive device of the brushless motor according to claim 4, wherein the control unit reduces a pulse shift region in accordance with an enlarged measurable range.

6. The drive device of the brushless motor according to claim 1, wherein the brushless motor drives a pump, and the control unit switches PWM output patterns according to an operation request of the pump.

7. The drive device of the brushless motor according to claim 6, wherein the pump causes a fluid to circulate through different circulation passages, and the control unit increases a position determination frequency when switching between passages of the pump is performed.

8. The drive device of the brushless motor according to claim 1, wherein the pulse width modulation control is performed with a fixed carrier frequency.

9. A drive method of a three-phase brushless motor including measuring an open-phase voltage in an energization period in pulse width modulation control of the three-phase brushless motor, estimating position information of a rotor based on the measured voltage value, and driving the three-phase brushless motor,
  the method comprising:
    when a voltage pulse width of a set duty cycle is less than or equal to a predetermined value, performing energization with a voltage pulse width of a minimum duty cycle twice in one period of pulse width modulation, the minimum duty cycle being capable of measuring a pulse induced voltage in a non-energized phase; and
    performing energization with a voltage pulse width of a correction duty cycle twice in next one period of the pulse width modulation,
  wherein energization with a voltage pulse width of a drive duty cycle corresponding to the set duty cycle is performed, on average in two periods,
  wherein in the pulse width modulation control, pulse shift control is performed when energization is performed to drive the three-phase brushless motor and the set duty cycle of an energized phase is less than or equal to a predetermined value, and the pulse shift control includes the energization with the voltage pulse width of the minimum duty cycle capable of measuring a pulse induced voltage in a non-energized phase, and the energization with the voltage pulse width of the correction duty cycle,
  wherein the energization with the voltage pulse width of the minimum duty cycle and the energization with the voltage pulse width of the correction duty cycle are performed from a major period to a correction period of the pulse width modulation control,
  wherein an interval between the energization with the voltage pulse width of the minimum duty cycle and the energization with the voltage pulse width of the correction duty cycle is set to be shorter than energization intervals in the respective duty cycles.

10. The drive method of the brushless motor according to claim 9, wherein
  switching between the energization with the voltage pulse width of the minimum duty cycle and the energization with the voltage pulse width of the correction pulse width is performed, when switching between PWM output patterns is performed.

11. The drive method of the brushless motor according to claim 9, wherein a length of the interval between the energization with the voltage pulse width of the minimum duty cycle and the energization with the voltage pulse width of the correction duty cycle is set to be equal to duration of dead time.

12. The drive method of the brushless motor according to claim 11, wherein the energization with the voltage pulse width of the minimum duty cycle immediately after the energization with the voltage pulse width of the correction duty cycle is set as a measurement target of the phase voltage.

13. The drive method of the brushless motor according to claim 12, wherein a pulse shift region is reduced in accordance with an enlarged measurable range.

14. The drive method of the brushless motor according to claim 9, wherein the pulse width modulation control is performed with a fixed carrier frequency.

\* \* \* \* \*